US007887974B2

(12) United States Patent
Osenar et al.

(10) Patent No.: US 7,887,974 B2
(45) Date of Patent: *Feb. 15, 2011

(54) INSERT-MOLDED, EXTERNALLY MANIFOLDED, SEALED MEMBRANE BASED ELECTROCHEMICAL CELL STACKS

(75) Inventors: Paul Osenar, Southborough, MA (US); Thomas Vitella, Franklin, MA (US); Nick Lauder, Newton, MA (US); Seth Avis, Chestnut Hill, MA (US); David Ferreira, North Scituate, RI (US); Ronald Rezac, Bolton, MA (US)

(73) Assignee: Protonex Technology Corporation, Southborough, MA (US)

(*) Notice: Subject to any disclaimer, the term of this patent is extended or adjusted under 35 U.S.C. 154(b) by 954 days.

This patent is subject to a terminal disclaimer.

(21) Appl. No.: 11/784,941

(22) Filed: Apr. 10, 2007

(65) Prior Publication Data
US 2007/0248866 A1    Oct. 25, 2007

Related U.S. Application Data

(63) Continuation-in-part of application No. 11/401,785, filed on Apr. 10, 2006.

(51) Int. Cl.
*H01M 8/04* (2006.01)
(52) U.S. Cl. ...................... 429/513; 429/512
(58) Field of Classification Search .............. 429/34, 429/35, 36
See application file for complete search history.

(56) References Cited

U.S. PATENT DOCUMENTS

| 4,212,929 A | 7/1980 | Grevstad et al. |
| 4,397,917 A | 8/1983 | Chi et al. |
| 4,476,197 A | 10/1984 | Herceg |
| 5,176,966 A | 1/1993 | Epp et al. |
| 5,514,487 A | 5/1996 | Washington et al. |
| 5,750,281 A | 5/1998 | Washington et al. |
| 6,080,503 A | 6/2000 | Schmid et al. |

(Continued)

FOREIGN PATENT DOCUMENTS

WO    WO-96/20509    7/1996

(Continued)

OTHER PUBLICATIONS

International Search Report and Written Opinion for PCT/US07/08954, dated Feb. 8, 2008.

(Continued)

*Primary Examiner*—Patrick Ryan
*Assistant Examiner*—Muhammad Siddiquee
(74) *Attorney, Agent, or Firm*—Edwards Angell Palmer & Dodge LLP

(57) ABSTRACT

The present invention provides, among other things, membrane cassettes and stacks thereof which are suitable for a use in a variety of electrochemical applications. The invention further provides membrane cassettes which comprise one or more external manifolds which deliver reagents and/or coolant to one or more reactant or coolant flow fields of the membrane cassettes. In particular, the present invention describes the insert molding method, whereby the plenums of the external manifolds are created during the stack encapsulation step. The invention describes several methods for creating the manifold runner geometry via insert-molding, machining, or with separate components.

20 Claims, 15 Drawing Sheets

U.S. PATENT DOCUMENTS

| | | |
|---|---|---|
| 6,596,427 B1 | 7/2003 | Wozniczka et al. |
| 6,689,504 B1 | 2/2004 | Matsumoto et al. |
| 6,887,610 B2 | 5/2005 | Elhamid et al. |
| 6,946,210 B2 | 9/2005 | Osenar et al. |
| 7,052,796 B2 | 5/2006 | Sabin et al. |
| 2002/0039675 A1 | 4/2002 | Braun et al. |
| 2003/0096153 A1* | 5/2003 | Osenar et al. ............... 429/35 |
| 2004/0195724 A1* | 10/2004 | Yoshida et al. ............. 264/261 |
| 2004/0247982 A1* | 12/2004 | Sabin et al. ................. 429/35 |
| 2005/0244703 A1 | 11/2005 | Osenar et al. |
| 2006/0057436 A1 | 3/2006 | Osenar et al. |
| 2006/0127735 A1 | 6/2006 | Sabin et al. |

FOREIGN PATENT DOCUMENTS

| | | |
|---|---|---|
| WO | WO-02/43173 | 5/2002 |
| WO | WO-03/036747 | 5/2003 |
| WO | WO-03/092096 | 11/2003 |
| WO | WO-2004/027896 | 1/2004 |
| WO | WO-2004/047210 | 6/2004 |

OTHER PUBLICATIONS

International Search Report and Written Opinion for PCT/US2008/068383, dated Sep. 11, 2008.

* cited by examiner

INSERT-MOLDED, EXTERNALLY MANIFOLDED, SEALED MEMBRANE BASED ELECTROCHEMICAL CELL STACKS

This application is a continuation-in-part of U.S. patent application Ser. No. 11/401,785, filed Apr. 10, 2006, which application is incorporated in its entirety by reference.

BACKGROUND OF THE INVENTION

Membrane based electrochemical cells, and particularly, proton exchange membrane (PEM) fuel cells are well known. PEM fuel cells convert chemical energy to electrical power with virtually no environmental emissions and differ from a battery in that energy is not stored, but derived from supplied fuel. Therefore, a fuel cell is not tied to a charge/discharge cycle and can maintain a specific power output as long as fuel is continuously supplied. Significant funds have been invested in fuel cell research and commercialization, indicating that the technology has considerable potential in the marketplace. However, the high cost of fuel cells when compared to conventional power generation technology deters their widespread use. The cost of fabricating and assembling fuel cells can be significant due to the materials and labor involved. Indeed, as much as 85% of a fuel cell's cost can be attributed to manufacturing.

Traditionally, one of the problems of using internally manifolded stacks in fuel cells and other electrochemical applications, is the area that is sacrificed in sealing around the internal manifolds. One remedy is to locate some or all of the manifolds external to the stack. One difficulty associated with that design is experienced in sealing between the manifold and the stack. As in traditional stacks, sealing is typically accomplished with gaskets and compression. Unfortunately, gasket/compression based seals have a number of inherent drawbacks, including a sensitivity to thermal cycling, requirements of uniform compression and associated hardware, high tolerance parts, and delicate assembly requirements.

In general, a single cell PEM fuel cell consists of an anode and a cathode compartment separated by a thin, ionically conducting membrane. This catalyzed membrane, with or without gas diffusion layers, is often referred to as a membrane electrode assembly (MEA). Energy conversion begins when the reactants, reductants and oxidants, are supplied to the anode and cathode compartments, respectively, of the PEM fuel cell. Oxidants include pure oxygen, oxygen-containing gases, such as air, and halogens, such as chlorine. Reductants, also referred to herein as fuel, include hydrogen, natural gas, methane, ethane, propane, butane, formaldehyde, methanol, ethanol, alcohol blends and other hydrogen rich organics. At the anode, the reductant is oxidized to produce protons, which migrate across the membrane to the cathode. At the cathode, the protons react with the oxidant. The overall electrochemical redox (reduction/oxidation) reaction is spontaneous, and energy is released. Throughout this reaction, the PEM serves to prevent the reductant and oxidant from mixing and to allow ionic transport to occur.

Current state of the art fuel cell designs comprise more than a single cell, and in fact, generally combine several MEAs, flow fields and separator plates in a series to form a fuel cell "stack"; thereby providing higher voltages and the significant power outputs needed for most commercial applications. Flow fields allow for the distribution of the reactants through the fuel cell and are typically separate from the porous electrode layers within the fuel cell. Depending on stack configuration, one or more separator plates may be utilized as part of the stack design to prevent mixing of the fuel, oxidant and cooling streams within the fuel cell stack. Such separator plates can also provide structural support to the stack.

Bipolar plates perform the same function as an oxidant flow field, fuel flow field and separator plate in combination and are often used in the design of fuel cells as their use can reduce the number of components required in the functioning fuel cell. These bipolar plates contain an array of channels formed in the surface of the plate contacting an MEA which function as the flow fields. The lands conduct current from the electrodes while the channels between the lands serve to distribute the reactants utilized by the fuel cell and facilitate removal of reaction by-products, such as water. Fuel is distributed from the fuel inlet port to the fuel outlet port, as directed by the channels, on one face of the bipolar plate, while oxidant is distributed from the oxidant inlet port to the oxidant outlet port, as directed by the channels, on the opposing face of the bipolar plate, and the two faces are not connected through the plate. The particular design of the bipolar plate flow field channels may be optimized for the operational parameters of the fuel cell stack, such as temperature, power output, gas humidification and flow rate. Ideal bipolar plates for use in fuel cell stacks are thin, lightweight, durable, highly conductive, corrosion resistant structures such as carbon/polymer composites or graphite. In the fuel cell stack, each bipolar plate serves to distribute fuel to one MEA of the stack through its fuel flow field face while distributing oxidant to a second MEA through the opposite oxidant flow field face. A thin sheet of porous paper, cloth or felt, usually made from graphite or carbon, may be positioned between each of the flow fields and the catalyzed faces of the MEA to support the MEA where it confronts grooves in the flow field to conduct current to the adjacent lands, and to aid in distributing reactants to the MEA. This thin sheet is normally termed a gas diffusion layer (GDL) and can be incorporated as part of the MEA.

Of necessity, certain stack components, such as the GDL portion of the MEA, are porous in order to provide for the distribution of reactants and byproducts into, out of, and within the fuel cell stack. Due to the porosity of elements within the stack, a means to prevent leakage of any liquid or gases between stack components (or outside of the stack) as well as to prevent drying out of the various stack elements due to exposure to the environment is also needed. To this end, gaskets or other seals are usually provided between the surfaces of the MEA or PEM and other stack components and on portions of the stack periphery. These sealing means, whether composed of elastomeric or adhesive materials, are generally placed upon, fitted, formed or directly applied to the particular surfaces being sealed. These processes are labor intensive and not conducive to high volume manufacturing, thereby adding to the high cost of fuel cells. Additionally, the variability of these processes results in poor manufacturing yield and poor device reliability.

Fuel cell stacks may also contain humidification channels within one or more of the coolant flow fields. These humidification channels provide a mechanism to humidify fuel and oxidants at a temperature as close as possible to the operating temperature of the fuel cell. This helps to prevent dehydration of the PEM as a high temperature differential between the gases entering the fuel cell and the temperature of the PEM causes water vapor to be transferred from the PEM to the fuel and oxidant streams.

Fuel cell stacks range in design depending upon power output, cooling, and other technical requirements, but may utilize a multitude of MEAs, seals, flow fields and separator plates, in intricate assemblies that result in manufacturing difficulties and further increased fuel cell costs. These multitudes of individual components are typically assembled into one sole complex unit. The fuel cell stack is formed by compressing the unit, generally through the use of end plates and bolts although banding or other methods may be used, such that the gaskets seal and the stack components are held tightly together to maintain electrical contact there between. These conventional means of applying compression add even more components and complexity to the stack and pose additional sealing requirements.

Various attempts have been made in the fuel cell art to address these deficiencies in fuel cell stack assembly design and thereby lower manufacturing costs. However, most stack assembly designs still require manual alignment of the components, active placement of the sealing means and/or a multi-step process, each of which presents notable disadvantages in practice. See, e.g., the processes described in U.S. Pat. No. 6,080,503, to Schmid et al., U.S. Pat. No. 4,397,917, to Chi et al., and U.S. Pat. No. 5,176,966, to Epp et al.

Additionally, in traditional fuel cell cassettes, two types of MEAs dominate; MEAs in which 1) the membrane extends beyond the borders of the gas diffusion layers, and 2) gasket materials are formed into the edges of the MEA itself with the membrane and GDLs approximately of the same size and shape (see, e.g., U.S. Pat. No. 6,423,439 to Ballard). In the first type, separate gaskets are used to seal between the membrane edge extending beyond the GDL and the other part of the stack (bipolar plates). In the second type, the gasket of the MEA seals directly to the other parts of the stack. Each of these methods requires compression to make a seal. These compressive-based seals require that all the components in the stack have high precision such that a uniform load is maintained. MEA suppliers have become accustomed to supplying the MEA formats above.

Still other attempts have been made to improve upon fuel cell design and performance. For instance, U.S. Pat. No. 4,212,929 describes an improved sealing method for fuel cell stacks. That patent reports a sealing system which utilizes a polymer seal frame clamped between the manifold and the stack. As described, the seal frame moves with the stack and the leak rate associated with a typical manifold seal is reduced during compression. U.S. Pat. No. 5,514,487 and U.S. Pat. No. 5,750,281 both describe an edge manifold assembly which comprises a number of manifold plates. The plates are mounted on opposite sides of the fuel cell stack and function in such a way to selectively direct the reactant and coolant streams along the perimeter of the stack. While these designs offer limited improvements to other conventional assemblies, they are generally unsuitable for high-volume manufacture.

Recognizing these and other deficiencies in the art, the Assignee of this application has developed a series of innovative methods for sealing manifold ports within the stack or a module thereof, as well as methods for sealing the stack or module periphery that are less labor intensive and more suitable to high-volume manufacturing processes (see World Publication WO 03/036747). That publication discloses a 'one-shot' assembly of fuel cell stacks (and other electrochemical devices) in which all of the component parts are assembled into a mold without gaskets. A resin is introduced into the mold and this resin selectively penetrates certain portions of the assembly either by resin transfer molding or injection molding techniques. Upon hardening, that resin seals the components and defines all the manifold channels within the stack. The net effect is to replace the gaskets of the traditional stack with adhesive based seals, introduced after the assembly of the components.

We also have previously described fuel cells having an MEA in which the GDL and membrane were more or less of the same general outline as each other and of the overall stack profile (see World Publication WO 03/092096). The major advantage of this technique is the ability to directly use a roll-to-roll MEA without having to do any post processing. However, a substantial portion of the cross-section of each MEA is used for sealing the various manifold openings and periphery of the stack such that only about 50% of the cell cross section is used for the electrochemical reaction.

We also have developed membrane-based electrochemical cells, and more particularly, PEM fuel cell stacks which comprise one or more composite MEAs having a molded gasket about the periphery. The gasket portion of the composite MEA has one or more features capable of regulating the flow of sealant during sealing processes (see World Publication 2004/047210).

In another previous patent application, the Assignee of this application reported on an innovative fuel cell stack design which assembles together individual modules to form a fuel cell stack of requisite power output where each module permanently binds a number of unit cells together (see World Publication WO 02/43173, incorporated herein by reference).

Despite these advancements over the prior the art, the Assignee of this application has recognized that further improvements can be made to the technology. One improvement, for example, would be to utilize a more significant portion of the total MEA area for the electrochemical process. For instance, with particular reference to those fuel cell stacks which include an internal manifold design, a certain cross-section of the cassette must be utilized for sealant channels and reactant/coolant manifolds; thus, that potentially active area is necessarily sacrificed. It also would be desirable to provide an improved fuel cell stack design that is less complex, more reliable, and less costly to manufacture. Additionally, it would be highly desirable to provide improved fuel cell stacks having reduced weight and size and (as noted above) in which a greater percent of the total MEA surface area is available for use in the electrochemical reaction occurring within the stack, e.g., available for catalyst area and proton transfer.

It also would be particularly desirable to develop stacks with features that reduce or eliminate coolant permeation, cross-leaks and external leaks, and which provide for uniform mating of internal components, such as the bipolar and cooling plates.

It would also be highly desirable to develop alternate embodiments. Two such examples include an insert molded method using separate runner/bridge components (wherein these components would eliminate the need for a hole in the side of the bi-polar plates), and second is a method utilizing alternate shapes for the plenum inserts (to optimize assembly and/or fuel cell performance).

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings. To achieve these and other advantages and in accordance with the purpose of the invention, as embodied herein and broadly described, the invention includes a fuel cell stack having at least one fuel cell with a membrane electrode assembly, a reductant flow field disposed proximate a first side of the membrane electrode assembly, the reductant flow field including a reductant flow channel extending to a periphery of the fuel cell, and an oxidant flow field disposed proximate a first side of the membrane electrode assembly, the oxidant flow field including an oxidant flow channel extending to the periphery of the fuel cell.

The fuel cell stack also includes a unitary plenum housing formed about the periphery of the fuel cell, the unitary plenum housing at least partially defining a reductant manifold in fluid communication with the reductant flow channel, the reductant manifold and the reductant flow channel cooperating to form a reductant plenum, and an oxidant manifold in fluid communication with the oxidant flow channel, the oxidant manifold and the oxidant flow channel cooperating to form an oxidant plenum.

In accordance with a further aspect of the invention, the fuel cell can further include a coolant plate in thermal communication with the membrane electrode assembly, the coolant plate including a coolant flow channel extending to the periphery of the fuel cell, and the unitary plenum housing can further define a coolant manifold in fluid communication with the coolant flow channel, the coolant manifold and the coolant flow channel cooperating to form a coolant plenum.

The cell stack can further include a vapor barrier insert disposed proximate at least one of the oxidant, reductant and coolant manifolds, the vapor barrier insert being adapted and configured to reduce egress of fluids through a periphery of the fuel cell stack. The vapor barrier insert can be surrounded by molded material of the plenum housing. The fuel cell stack can further include a vapor barrier layer disposed proximate the external periphery of the plenum housing, the vapor barrier layer being adapted and configured to reduce egress of fluids through a periphery of the fuel cell stack. The vapor barrier insert can be made from a material selected from among plastic, metal, composite material, any other suitable material, and combinations thereof.

In accordance with another aspect of the invention, the unitary plenum housing can define the reductant manifold in cooperation with a portion of the periphery of the fuel cell. The portion of the periphery of the fuel cell includes at least one of an edge of the membrane electrode assembly and an edge of a plate.

In accordance with still another aspect of the invention, the unitary plenum housing can define the oxidant manifold in cooperation with a portion of the periphery of the fuel cell. The portion of the periphery of the fuel cell can include at least one of an edge of the membrane electrode assembly and an edge of a plate.

In accordance with a further aspect of the invention, the unitary plenum housing can define the coolant manifold in cooperation with a portion of the periphery of the fuel cell. The portion of the periphery of the fuel cell includes at least one of an edge of the membrane electrode assembly and an edge of a plate.

In accordance with another aspect of the invention, it is possible for the reductant manifold to not be defined by the periphery of the fuel cell. It is possible for the oxidant manifold to not be defined by the periphery of the fuel cell. Moreover, it is also contemplated that it is possible for the coolant manifold to not be defined by the periphery of the fuel cell.

In accordance with still another aspect of the invention, the fuel cell stack can include a plurality of fuel cells electrically connected in series. The fuel cell stack can also include a plurality of cooling plates in thermal communication with the fuel cells.

In accordance with a further aspect of the invention, the reductant flow field and oxidant flow field can each be integrally formed into a separator plate, the separator plate being chosen from the group including a bipolar plate and a cooling plate. The reductant flow channel and the oxidant flow channel can each terminate at the periphery of the fuel cell at a port that extends only partially through the thickness of the separator plate.

Each separator plate can define a contoured feature proximate a port of a flow channel at the periphery of the fuel cell, the contoured feature being adapted and configured to mate with a removable mold when the plenum housing is being formed. The contoured feature can be substantially concave in shape and can be adapted to receive a mold that is substantially cylindrical in shape when the plenum housing is being formed. The separator end plate can include material selected from among carbon/polymer composite material, graphite, metal, and any other suitable material. It is also contemplated that graphite can include graphite tape. The bipolar plate can be stamped from a metal sheet.

In accordance with another aspect of the invention, the reductant flow field includes a second reductant flow channel extending to a periphery of the fuel cell and the oxidant flow field includes a second oxidant flow channel extending to the periphery of the fuel cell. The unitary plenum housing can further define a second reductant manifold in fluid communication with the second reductant flow channel, the second reductant manifold and the second reductant flow channel cooperating to form a second reductant plenum, and a second oxidant manifold in fluid communication with the second oxidant flow channel, the second oxidant manifold and the second oxidant flow channel cooperating to form a second oxidant plenum.

In accordance with still another aspect of the invention, the coolant plate can include a second flow channel extending to the periphery of the fuel cell, and the unitary plenum housing can further define a second coolant manifold in fluid communication with the second coolant flow channel, the second coolant manifold and the second coolant flow channel cooperating to form a second coolant plenum.

In accordance with a further aspect of the invention, the active area of the membrane electrode assembly can be maximized by not providing an aperture passing through the fuel cell along a direction from a first endplate of the stack toward a second end plate of the stack.

In accordance with still another aspect of the invention, the fuel cell stack can further include a first end plate at a first end of the stack and a second end plate at the second end of the stack. The fuel cell stack can further include a plurality of fasteners for connecting the first and second end plates to each other to hold the fuel cell in place. At least one of the end plates can include recesses formed therein proximate an extremity of one of the manifolds, the recess being adapted and configured to receive a removable mold when the plenum housing is being formed.

It is also contemplated that each end plate can include material selected from among a thermoset polymer, a thermoplastic polymer, a metal, a metal alloy, a filled polymer composite material, any other suitable material, and combinations thereof. In accordance with still another aspect of the invention, one of the endplates can include a fill hole and the other end plate can include a vent hole to facilitate forming the plenum housing by way of a molding process.

In accordance with a further aspect of the invention, the fuel cell stack can further include an electrical current collector electrically coupled to the membrane electrode assembly. It is also contemplated that at least one of the end plates can include ports in fluid communication with the reductant plenum and oxidant plenum for transporting materials through the fuel cell stack.

In accordance with another aspect of the invention, at least one of the manifolds can have a tapered configuration from a first end of the manifold to a second end of the manifold. The tapered manifold can have a smaller transverse dimension that enlarges to a larger transverse dimension along a length of the manifold toward an external port of the fuel cell stack. The tapered manifold can be defined by a substantially cylindrical surface proximate the periphery of the fuel cell, and a tapering surface opposite the substantially cylindrical surface.

In accordance with still another aspect of the invention, the fuel cell stack can further include a tubular insert integrally formed into one end of one of the manifolds, the tubular insert made from a material that is compatible with the material of the plenum housing, wherein the tubular insert forms a portion of a fluid flow path including the manifold to which it is attached. The tubular insert can protrude through a port of an end plate of the fuel cell stack proximate the plenum housing.

The invention also includes a method for manufacturing a fuel cell stack. The method includes providing at least one fuel cell having a membrane electrode assembly, a reductant flow field disposed proximate a first side of the membrane electrode assembly, the reductant flow field including a reductant flow channel extending to a periphery of the fuel cell, and an oxidant flow field disposed proximate a first side of the membrane electrode assembly, the oxidant flow field including an oxidant flow channel extending to the periphery of the fuel cell. The method also includes molding a plenum housing about the periphery of the fuel cell, the plenum housing at least partially defining a reductant manifold in fluid communication with the reductant flow channel, the reductant manifold and the reductant flow channel cooperating to form a reductant plenum, and an oxidant manifold in fluid communication with the oxidant flow channel, the oxidant manifold and the oxidant flow channel cooperating to form an oxidant plenum.

In further accordance with the invention, the fuel cell can further include a coolant plate in thermal communication with the membrane electrode assembly, the coolant plate including a coolant flow channel extending to the periphery of the fuel cell and the molding step can include forming can include forming a coolant manifold in fluid communication with the coolant flow channel, the coolant manifold and the coolant flow channel cooperating to form a coolant plenum.

The molding step can define an interior surface of at least one of the oxidant manifold, reductant manifold and coolant manifold in cooperation with a portion of the periphery of the fuel cell. The portion of the periphery of the fuel cell includes at least one of an edge of membrane electrode assembly and an edge of a plate. It is possible for at least one of the oxidant manifold, reductant manifold, and coolant manifold to not be defined by the periphery of the fuel cell.

The coolant plate can include a second coolant flow channel extending to the periphery of the fuel cell and the molding step can further include forming a second coolant manifold in fluid communication with the second coolant flow channel, the second coolant manifold and the second coolant flow channel cooperating to form a second coolant plenum.

The method can further include positioning a vapor barrier insert proximate at least one of the oxidant, the reductant and coolant manifolds prior to the molding step, the vapor barrier insert being adapted and configured to reduce egress of fluids through a periphery of the fuel cell stack once molded in place. The vapor barrier insert can be made from a material selected from plastic, metal composite material, any other suitable material, and combinations thereof.

In accordance with another aspect of the invention, the method can further include integrally forming the reductant flow field and oxidant flow field into a separator plate, the separator plate being chosen from the group consisting of a bipolar plate and a cooling plate. The method can further include forming a contoured surface in the edge of each separator plate proximate a port of a flow channel at the periphery of the fuel cell, the contoured surface being adapted and configured to mate with a removable manifold mold.

The contoured feature can be substantially concave in shape and can be adapted to receive a mold that is substantially cylindrical in shape when the plenum housing is being formed. The method can further include forming a recess in an end plate of the fuel cell stack proximate a flow channel at the periphery of the fuel cell, the recess being adapted and configured to receive an end portion of a manifold mold. It is also envisioned that the method can include positioning a manifold mold against the contoured portion.

The method can further include molding material around the fuel cell and mold to define the manifold. A first end plate of the fuel cell stack can include a fill hole for receiving molding material and a second end plate of the fuel cell stack can include a vent hole to permit venting of fluids and molding material to facilitate molding the plenum during the molding process. The method can also include the step of removing the mold.

In accordance with a further aspect of the invention, the reductant flow field can include a second reductant flow channel extending to a periphery of the fuel cell and the oxidant flow field can include a second oxidant flow channel extending to the periphery of the fuel cell and the molding step can further include forming a second reductant manifold in fluid communication with the second reductant flow channel, the second reductant manifold and the second reductant flow channel cooperating to form a second reductant plenum, and forming a second oxidant manifold in fluid communication with the second oxidant flow channel, the second oxidant manifold and the second oxidant flow channel cooperating to form a second oxidant plenum.

In accordance with still another aspect of the invention, the method can further include positioning a first end plate at a first end of the at least one fuel cell and positioning a second end plate at a second end of the at least one fuel cell. The method can further include connecting the first and second end plates to each other with a plurality of fasteners to hold the fuel cell in place.

It is also contemplated that the method can include inserting at least one removable runner mold into at least one of the oxidant flow channel and reductant flow channel to prevent molding compound from entering the channel and to define a flow passage. The method can further include molding material about the fuel cell and the runner mold to form the flow passage.

It is also envisioned that the method can further include removing the runner mold and inserting a manifold mold. The manifold mold can be substantially cylindrically shaped. It is also contemplated that the manifold mold can taper along a direction from a first end of the mold to the second end of the mold. The method can also include molding material about the fuel cell and the manifold mold to form the manifold. It is also envisioned that the method can further include removing the manifold mold.

In accordance with a further aspect of the invention, the method can further include positioning a mold against the fuel cell, the removable mold having a shape that defines the volume of at least one of the oxidant manifold and reductant manifold. The mold can include an elongate manifold portion and a plurality of runner portions, the runner portions being adapted and configured to contact flow passages in the periphery of the fuel cell.

The method can further include molding material about the fuel cell and the mold. It is also contemplated that the method can further include placing the fuel cell and mold inside of a mold cavity prior to performing the mold operation, the mold cavity having a geometry for defining a peripheral boundary of the fuel cell stack. The method can also include removing the mold after removing the molding operation.

In accordance with another aspect of the invention, the method can further include integrally forming a tubular insert into the plenum housing proximate an end of one of the manifolds, the tubular insert being made from a material that is compatible with the material of the plenum housing, wherein the tubular insert forms a portion of a fluid flow path including the manifold to which it is attached. The method can further include fitting an end plate of the fuel cell stack over the tubular insert such that the tubular insert protrudes through a port of the end plate of the fuel cell stack.

Material introduced during the molding step can be introduced by a technique selected from among pressure assisted resin transfer, vacuum assisted resin transfer, injection molding, any other suitable technique, and combinations thereof. The material can be introduced under a pressure differential of between about +15 psi and about −15 psi. It is also envisioned that the material can be introduced by pressure assisted resin transfer under a positive pressure of between 0 psi and about 250 psi. The material can be introduced by vacuum assisted resin transfer under a partial pressure of between about 750 Torr and about 1 mTorr.

It is to be understood that both the foregoing general description and the following detailed description are exemplary and are intended to provide further explanation of the invention claimed.

DETAILED DESCRIPTION OF THE INVENTION

Definitions

Before further description of the present invention, and in order that the invention may be more readily understood, certain terms are first defined and collected here for convenience.

Figure 1:
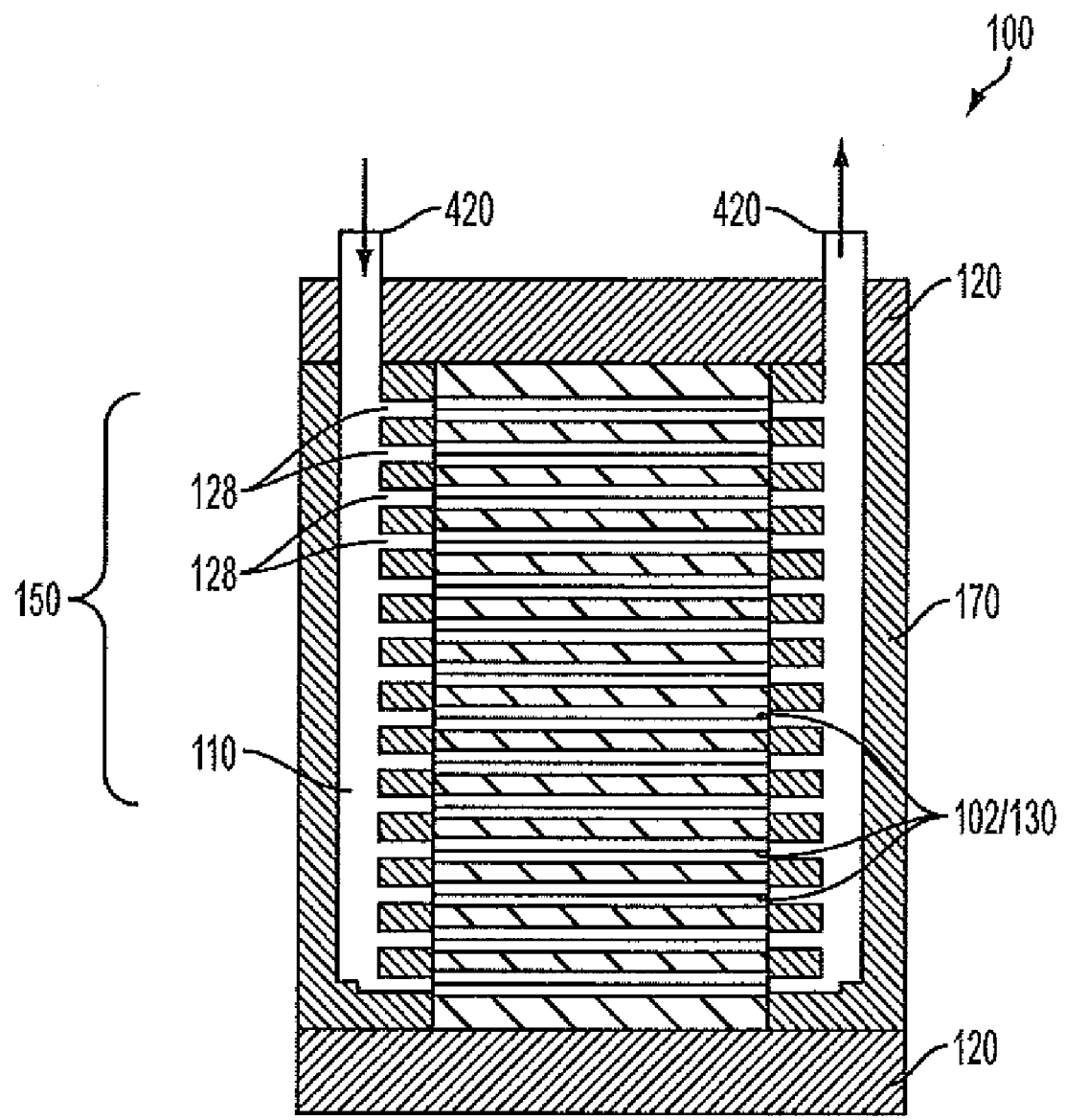
FIG. 1 is a cross-sectional schematic of a typical electrochemical cell stack showing the various components.

As used herein, the term "plenum" means the geometry or component that creates the common volume of reactant and/or coolant manifolds, e.g. plenum 110 in FIG. 1.

Figure 11:
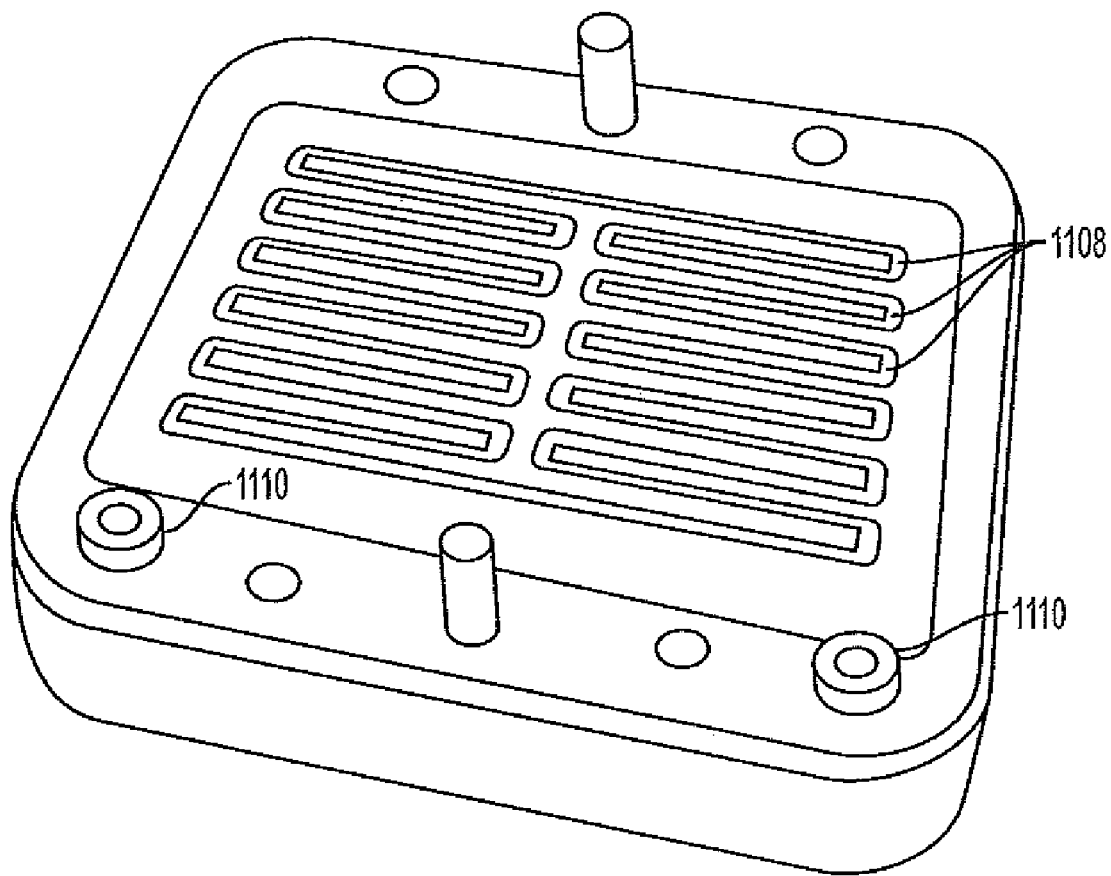
FIG. 11 is a cutaway stack showing the integral plenums that are formed by removal of the inserts after the molding process.
Figure 12:
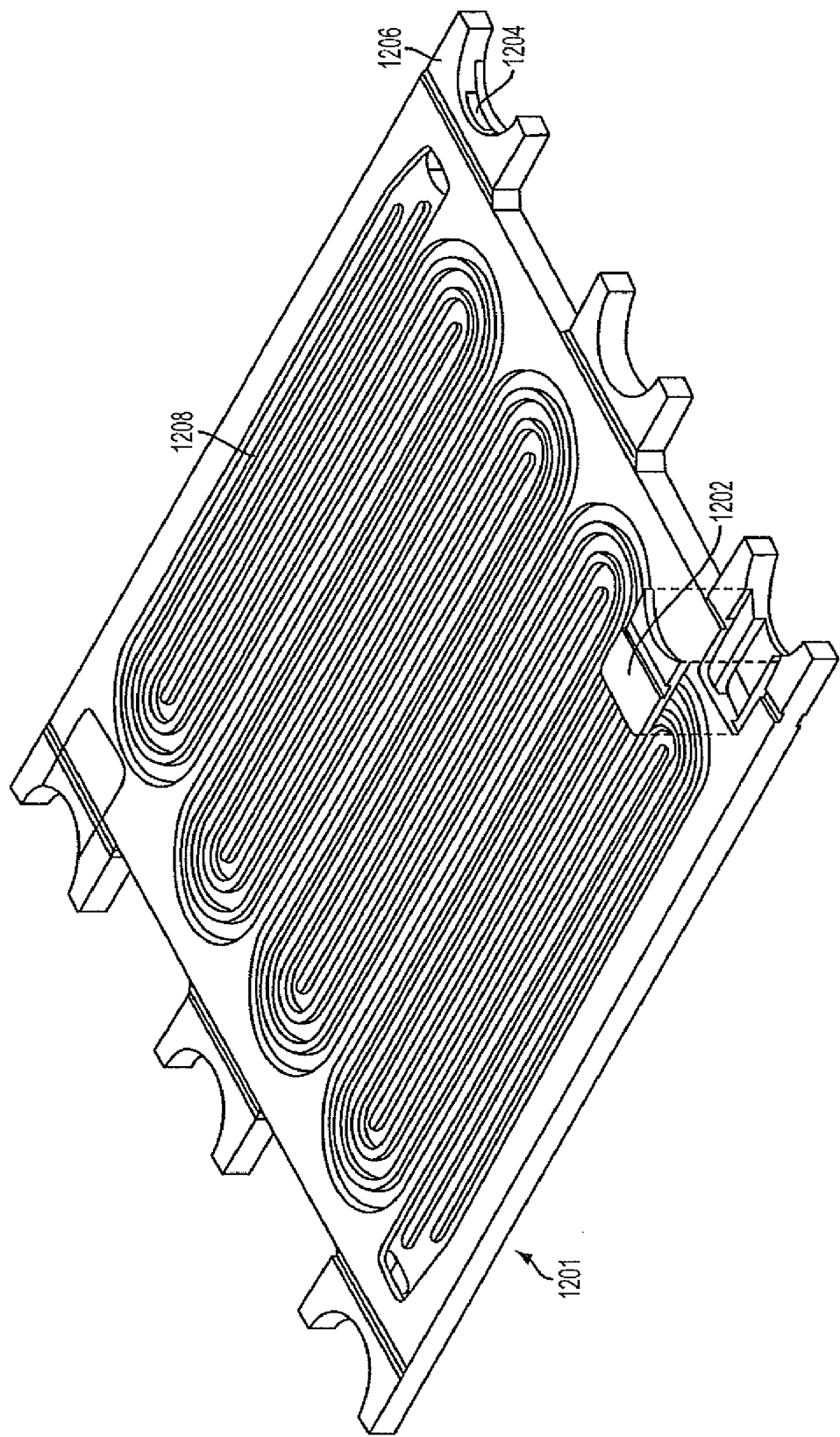
FIG. 12 shows the use of discrete bridge components within a bipolar plate to provide the runner geometry required for single step molding.

The term "runners", e.g. runners 128 in FIG. 1 are the sections of the manifold that distribute the reactant and/or coolant to the individual cells/flow fields (e.g. flow fields 1208 shown in FIG. 12 and fields 1108 shown in FIG. 11). In certain embodiments, the runners are integrated into the bipolar plates (e.g. integral runners 604 in bipolar plates 602 in FIG. 5) of the fuel cell stack (e.g. stack 100 in FIG. 100). In another embodiment, the runners are molded in place with an insert or inserts (e.g. runner inserts 202 in FIG. 2) that are removed after molding. For both embodiments, the plenum is molded in place with an insert (e.g. insert 207 in FIG. 2) that is removed after molding.

The term "bridge" is a discrete component added to a flow field or bipolar plate to provide a runner without side drilling, e.g. bridge 1202 in FIG. 12.

The term "manifold" is defined as the combination of the runners and the plenum, e.g. manifold 150 in FIG. 1.

MEA Stacks of the Invention

In certain aspects, the instant invention provides an electrochemical cassette comprising, at least one electrochemical cell which comprises a membrane electrode assembly (MEA), a reductant flow field, an oxidant flow field, a separator plate, at least one reductant external manifold and at least one oxidant external manifold, wherein each flow field comprises at least one opening extending through the periphery of the cell and each external manifold comprises a primary manifold and at least one port in fluid contact with the peripheral openings in the flow field to which the external manifold is intended to deliver material, wherein the one or more MEA, oxidant flow field, reductant flow field, and separator plate, are assembled and encapsulated about the periphery thereof by a sealant; and wherein each external manifold is a volume at least partially bounded by the sealant and wherein the volume is in contact with the peripheral openings in the flow field to which the external manifold is intended to deliver material.

In certain embodiments, the invention provides for an electrochemical cassette, wherein each external manifold is a volume substantially bounded by the sealant, e.g. molded region 170 in FIG. 1.

In another embodiment, the invention provides for an electrochemical cassette, wherein each external manifold is a volume substantially bounded by the sealant and at least one additional element comprising, the one or more MEA, oxidant flow field, reductant flow field, second sealant layer, or separator plate. In a further embodiment, the external manifold is a volume substantially bounded by the sealant and the membrane electrode assembly or plate. In another further embodiment, the external manifold is a volume substantially bounded by the sealant and a second sealant layer.

In yet another embodiment, the invention provides for an electrochemical cassette, wherein each reductant external manifold and each oxidant external manifold comprises a volume substantially bounded by the sealant and optionally one additional fluid impermeable material, wherein the volume is defined by at least one removable mold element which is fluidly connected with the peripheral openings of the flow fields to which the manifold is intended to deliver or remove material. In a further embodiment, the removable mold element is removed after encapsulation of the periphery of the cassette with the sealant.

In other embodiments, the invention provides for an electrochemical cassette, wherein a separator plate and one or two flow fields are integrated into a bipolar plate and each flow field peripheral opening extends through only a portion of the thickness of the bipolar plate.

In a further embodiment, each flow field peripheral opening comprises an adapter capable of forming a fluid tight seal with the removable molding element placed in contact with the flow field peripheral openings. A "fluid tight seal" or "sealant tight seal," which are used interchangeably herein is, e.g., a gas and/or liquid tight seal, wherein the sealant may penetrate the edges of the MEA but is prevented from entering the manifold opening. In another further embodiment, each flow field opening extends through a portion of the surface of the bipolar plate and provides fluid contact between the external manifold and the flow field to which the manifold is delivering material. In another further embodiment, each flow field opening extends through a portion of the thickness of the bipolar plate without extending through the surface of the plate.

In a further embodiment, the adapter comprises a flat surface capable of mating to a removable mold element having a planar surface or the adapter comprises a curved surface capable of mating to a cylindrical removable mold element or an elliptical prism.

In another further embodiment, the removable mold element comprises a main body and a plurality of protrusions and the adapter comprises a concave volume capable of forming a fluid tight seal with a protrusion of the removable mold element.

In still further embodiments, each flow field peripheral opening forms a fluid tight seal to a molding element used to form the external manifold. In another further embodiment, the molding element is a solid body comprising a plenum and at least one runner, wherein the plenum defines the volume of the manifold and the runners form a fluid tight seal with each flow field peripheral openings such that the manifold is fluidly connected to the flow field after removal of the molding element. In another further embodiment, the cassette further comprises at least one coolant flow field wherein each coolant flow field comprises at least two opening extending through the periphery of the flow field and at least two coolant external manifolds each comprising a primary manifold and at least one port capable of coupling to the peripheral openings in the coolant flow field. In still another further embodiment, each bipolar plate has zero or one oxidant flow field, has zero or one reductant flow field, and zero or one coolant flow field.

In other embodiments, the invention provides an electrochemical cassette, wherein each membrane electrode assembly is in contact with a reductant flow field and an oxidant flow field.

In another embodiment, the invention provides an electrochemical cassette, wherein each reductant external manifold and each oxidant external manifold comprises a volume bound by a substantially homogenous composition, wherein each manifold comprises the primary manifold and at least one port capable of mating to the peripheral opening of an equal number of flow fields to which the manifold is intended to deliver or remove material.

In a further embodiment, each external manifold is a volume substantially bounded by the sealant and at least one additional element comprising, the one or more MEA, oxidant flow field, reductant flow field, second sealant layer, or separator plate. In further embodiments, the external manifold is a volume substantially bounded by the sealant and/or the membrane electrode assembly or plate. In a further embodiment, the external manifold is a volume substantially bounded by the sealant and a second sealant layer.

In yet another further embodiment, each reductant external manifold and each oxidant external manifold comprises a volume bound by the sealant.

In other embodiments, the invention provides an electrochemical cassette, wherein the sealant contemporaneously seals the junction between the removable molding element and the peripheral openings of the flow fields to which the manifold is intended to deliver a material during the encapsulation process wherein void formed by removal of the molding element forms the volume of the external manifolds fluidly connected to the flow fields to which the manifold is intended to deliver a material.

In still other embodiments, the invention provides an electrochemical cassette, wherein each composite MEA and each separator plate comprises no grooves, holes or other aperture extending through the entire thickness thereof.

In yet other embodiments, the invention provides an electrochemical cassette, wherein cassette further comprises at least one coolant flow field wherein each coolant flow field comprises at least two openings extending through the periphery of the flow field and at least two coolant external manifolds each comprising a primary manifold and at least one port capable of coupling to the peripheral openings in the coolant flow field.

In a further embodiment, each reductant external manifold and each oxidant external manifold comprises a single component comprising the primary manifold conduit and at least one port capable of mating with peripheral openings of an equal number of flow fields to which the manifold is intended to deliver material; and each coolant external manifold opening comprises a single component comprising the primary manifold conduit and at least one port capable of mating to peripheral openings of an equal number of coolant flow fields.

In still other embodiments, the invention provides an electrochemical cassette, wherein each external manifold comprises at least two primary manifolds and at least two sets of ports which are not fluidly connected such that each primary manifold and each set of ports can deliver or remove material to flow fields to which each primary manifold is intended to deliver or remove material.

In certain embodiments, the electrochemical cassette is a fuel cell cassette.

In other embodiments, the bipolar plate is machined or molded out of at least one of a carbon/polymer composite, graphite or metal.

In still other embodiments, the bipolar plate is stamped from a metal sheet. In a further embodiment, the bipolar plate is a graphite tape. The term "graphite tape" is graphite, formed, embossed, and infused with resin to harden into a shape; such as carbon polymer composite.

In other embodiments, the invention provides an electrochemical cassette, wherein the sealant is introduced by pressure assisted resin transfer, by vacuum assisted resin transfer, or by injection molding. In a further embodiment, the sealant or resin is introduced under a pressure differential of between about +15 psi and about −15 psi. In another further embodiment, the sealant is introduced by pressure assisted resin transfer under a positive pressure of between 0 psi and about 250 psi. In another further embodiment, the sealant or resin is introduced by vacuum assisted resin transfer under a partial pressure of between about 750 Torr and about 1 mTorr.

In other aspects, the invention provides an electrochemical cassette prepared by the process comprising the steps of: (a) providing a membrane electrode assembly (MEA), a reductant flow field, an oxidant flow field, a separator plate, at least one removable molding element to form a reductant manifold, wherein each flow field comprises at least one opening extending through the periphery of the cell and each removable manifold element has a three-dimensional volume which defines an external manifold comprising a primary manifold and at least one port capable of coupling to the at least one peripheral openings in the flow field to which the external manifold is intended to deliver material, (b) assembling the membrane electrode assembly (MEA), the reductant flow field, the oxidant flow field, the separator plate, and the removable molding element forming the reductant manifold, (c) sealing the periphery of the cassette by applying a pressure differential to the cassette such that 1) the peripheral edges of the cassette are encapsulated together by a resin; and 2) the removal molding elements forming the reductant manifold and the removable molding element forming the oxidant manifold forms a reductant manifold and an oxidant manifold.

In one embodiment, the invention provides an electrochemical cassette, further comprising at least one removable molding element to form an oxidant manifold.

In another aspect, the invention provides an electrochemical cassette prepared by the process comprising the steps of: (a) providing a membrane electrode assembly (MEA), a reductant flow field, an oxidant flow field, a separator plate, at least one removable molding element to form a reductant manifold, wherein each flow field comprises at least one opening extending through the periphery of the cell and each removable manifold element has a three-dimensional volume which defines an external manifold comprising a primary manifold and at least one port capable of coupling to the at least one peripheral openings in the flow field to which the external manifold is intended to deliver material, (b) assembling the membrane electrode assembly (MEA), the reductant flow field, the oxidant flow field, the separator plate, and the removable molding element forming the reductant manifold, (c) sealing the periphery of the cassette by applying a pressure differential to the cassette such that 1) the peripheral edges of the cassette are encapsulated together by a resin; and 2) the removal molding elements forming the reductant manifold forms a reductant manifold; wherein the oxidant flow field is left open.

In certain embodiments, the invention provides the electrochemical cassette, wherein each bipolar plate or separator plate is side drilled to include external manifold geometry as well as the typical flow field geometry. In a further embodiment, each external manifold is bounded by the sealant.

In certain aspects, the invention provides for a fuel cell stack comprising: (a) at least one electrochemical cassette of the invention; (b) at least one end plate assembly; wherein the end plate is assembled on the top and/or bottom of the stack of one or more electrochemical cassettes.

In one embodiment, the invention provides a fuel cell stack, wherein the end plate assembly is assembled with the electrochemical cassette(s) prior to encapsulation such that the end plate and fuel cell cassettes(s) are encapsulated and sealed in combination.

In another embodiment, the invention provides a fuel cell stack, wherein a compression means is applied to the stack to provide compressive force to the fuel cell stack. In certain embodiments, the compression occurs before, during, or after encapsulation.

In other embodiments, the invention provides a fuel cell stack, wherein the end plate assembly is attached to one or more electrochemical cassettes after encapsulation of the electrochemical cassette(s).

In still other embodiments, the invention provides a fuel cell stack, wherein the end plate assembly is attached by a compressive seal.

In yet another embodiment, the invention provides a fuel cell stack, wherein at least one of the end plate assemblies is composed of a thermoset polymer, a thermoplastic polymer, a metal, or a metal alloy.

In another embodiment, the invention provides a fuel cell stack, wherein at least one of the end plate assemblies is composed of a filled polymer composite. In a further embodiment, the filled polymer composite is a glass fiber reinforced thermoplastic or a graphite reinforced thermoplastic.

In another embodiment, the invention provides a fuel cell stack, wherein at least a portion of one of the end plates is composed of an electrically conductive metal or metal alloy. In a further embodiment, at least a portion of the cassette or one of the end plate assemblies is a copper current collector.

In certain embodiments, the instant invention provides the advantage in that the requirement for runner tubes is no longer necessary. The geometries of the manifold and runners are cast directly into the sealant. In a further embodiment, the geometries are formed by side drilling the bipolar plates to include the runner geometry within the bipolar plate, wherein the process is referred to as a one step molding of the manifold. In a further embodiment, the runner hole geometry is molded into the side of the bipolar plate. In another further embodiment, the bridge component within the bipolar plate is used to accomplish the runner geometry without the side drilling of the bipolar plate, also referred to as a one step method. In other embodiments, separate runner and plenum molding pieces are used, herein referred to as a two step method. In other embodiments, the integral runner and plenum molding pieces are used.

Figure 13:
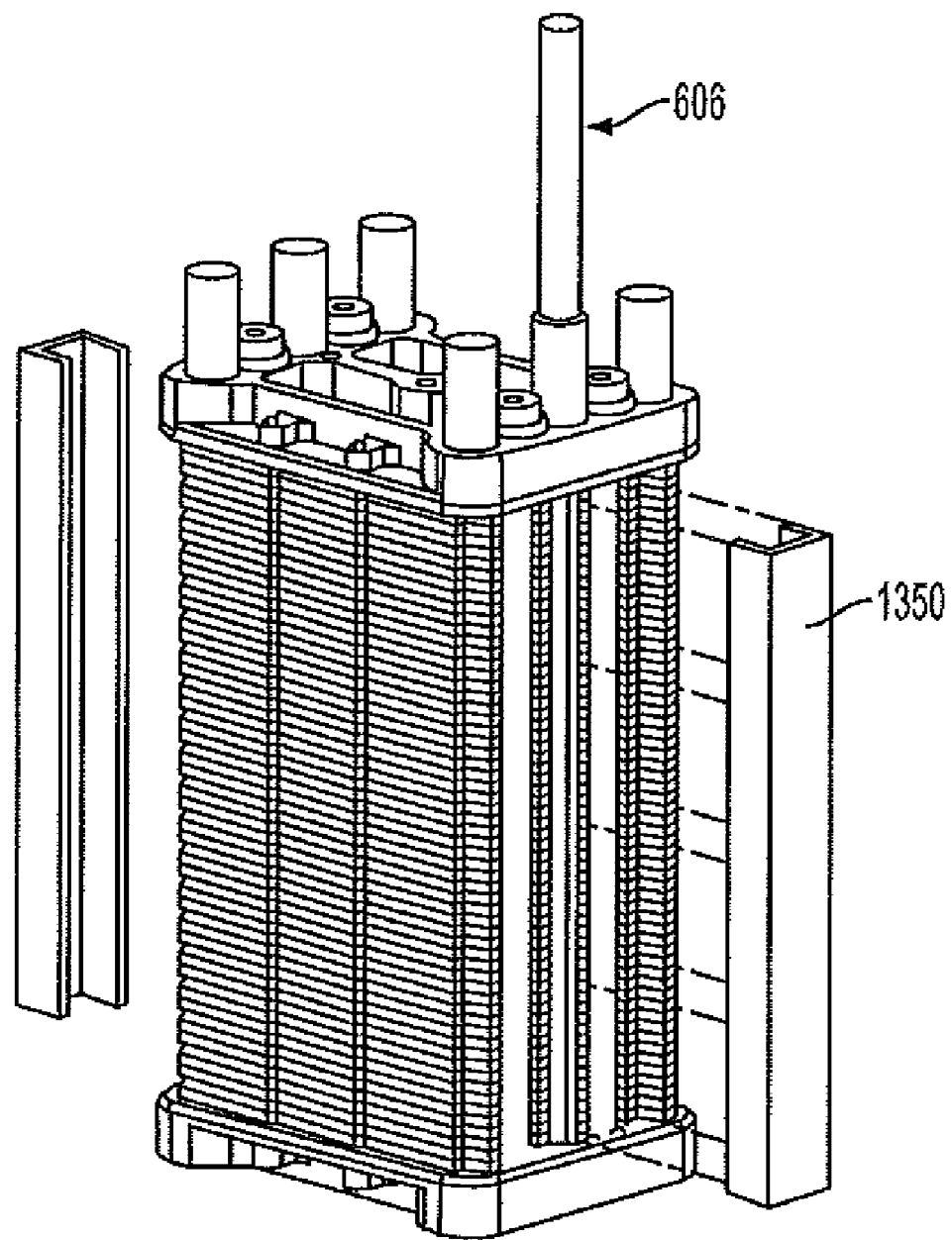
FIG. 13 shows a stack which employs a vapor barrier component to reduce coolant permeation.
Figure 16:
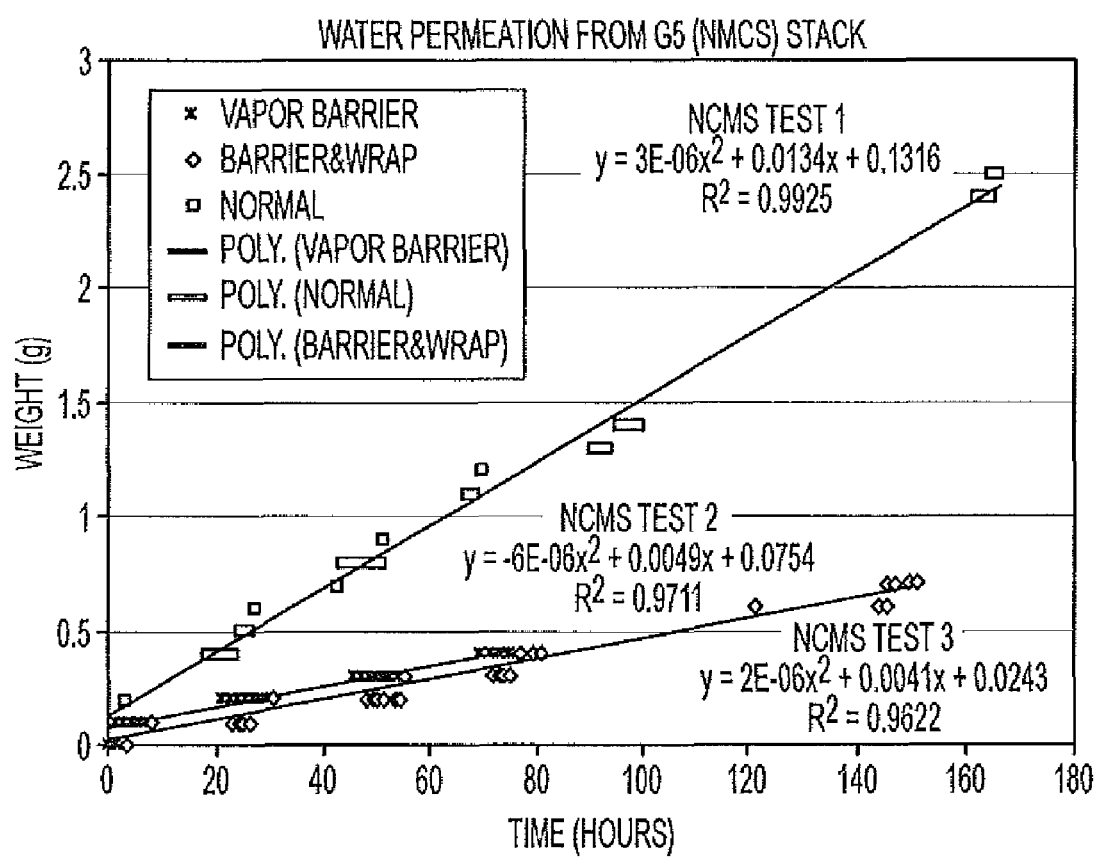
FIG. 16 shows cell vapor leakage curves to demonstrate the effectiveness of vapor barriers in accordance with the invention.

In certain preferred embodiments of the invention, fuel cell stacks of the invention also comprise a vapor barrier (e.g. which reduces coolant permeation. The permeation of coolant (in vapor form) through the stack sidewalls can lead to a significant coolant loss over time. This requires periodic servicing of the fuel cell system to re-fill the coolant reservoir. This effect is generally undesirable and one goal for optimum fuel cell stack design is to reduce or eliminate this permeation. To address this issue, the insert-molded fuel cell stack may employ a vapor barrier component. An example of this component, vapor barrier 1350 shown in FIG. 13, is made to fit over the coolant, air, or fuel manifolds such that it substantially surrounds the manifold. The skilled artisan will appreciate that the vapor barrier component may be constructed from a variety of materials, preferably an impermeable or low-permeability material (typically metal or plastic). The vapor barrier may be assembled to the stack and then molded in place, or alternately, it may be applied to the stack after the molding and curing steps. FIG. 16 shows results from permeation testing showing effectiveness of the vapor barrier in 36-cell stack with 18 sq. cm (2.8 sq. in.) per cell. In FIG. 16, water permeation was compared for cell stacks having no vapor barrier, having a vapor barrier, and having a vapor barrier plus foil wrapped around the cell stack. As shown in FIG. 16, the vapor barrier substantially reduces vapor loss from cell stacks, and the additional foil wrap further reduces vapor loss.

Figure 14:
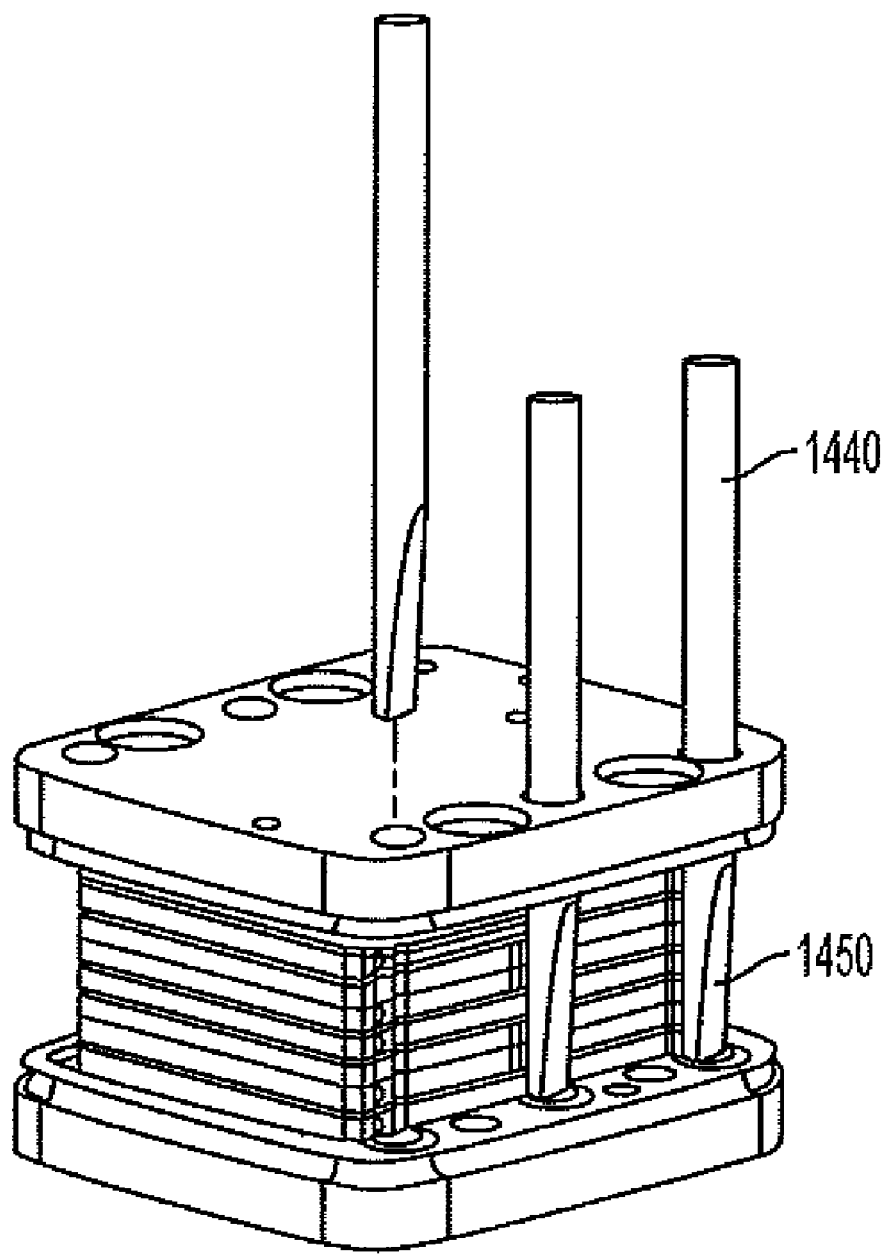
FIG. 14 shows a stack which incorporates a tapered manifold plenum geometry.

The unique design of the present invention also may include a tapered manifold plenum geometry. This aspect of the invention includes tapered manifold inserts 1440 such as those shown in FIG. 14. Preferably, the inserts are tapered on the side 1450 facing out from the stack components, thereby facilitating a uniform mating feature for all of the bipolar and cooling plates. Used in accordance with the present invention, the tapered manifold inserts 1440 offer numerous advantages (e.g., more uniform velocity, pressure drop, and flow distribution) over conventional stack designs.

Figure 15:
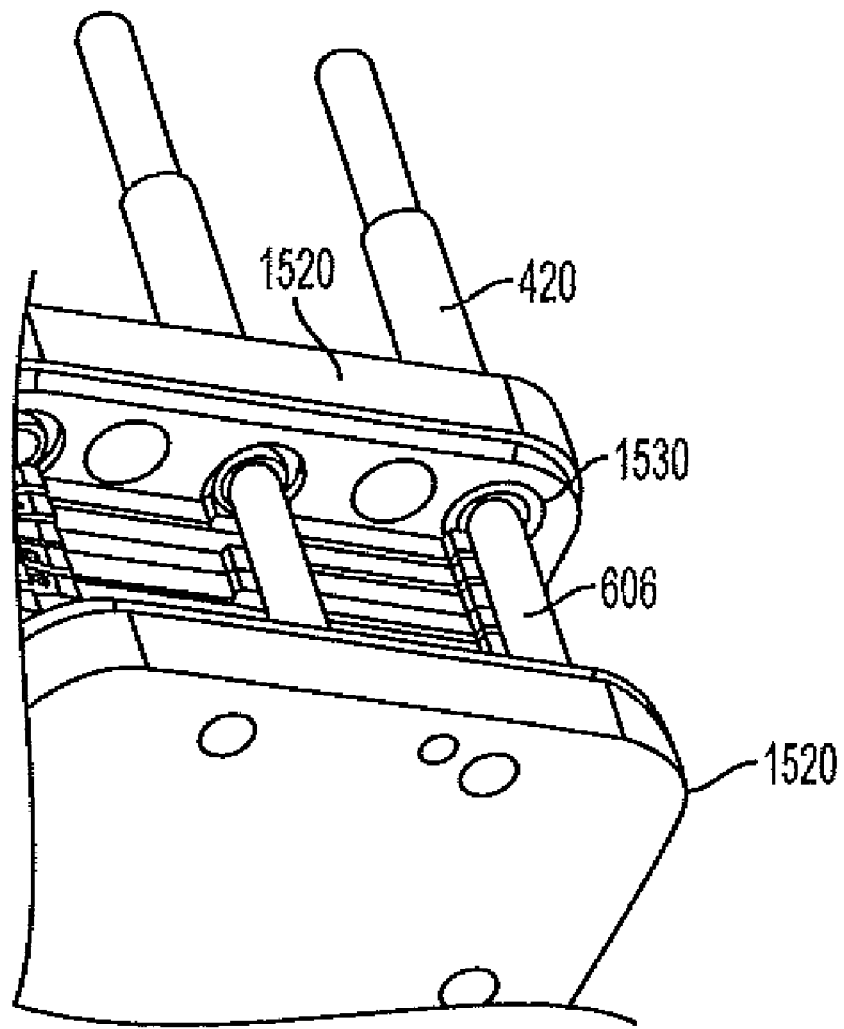
FIG. 15 shows a stack design utilizing combination compressive (mechanical) and adhesive seals in relation to the junction of the terminal bipolar plates and the endplates.

In yet other preferred embodiments, insert-molded stacks of the invention utilize a combination of compressive (mechanical) and adhesive seals. This sealing feature 1530, illustrated in FIG. 15, substantially reduces or eliminates cross-leaks and/or external leaks. In the construction of insert-molded stacks, the transition of the manifold at the junction of the terminal bipolar plates and the endplates 1520 can create a leak path unless the molded compound has sufficient adhesion to the endplates. The leak path can lead to cross-leaks and/or external leaks.

To avoid the necessity of priming the endplates or otherwise preparing them for adhesion to the molding compound, a combination compressive/adhesive sealing feature 1530 may be employed. This sealing feature may be an o-ring or a short tube section that will adhere to the molded compound used in the stack construction. This creates an adhesive seal that stops the leak path and contains it to its respective manifold. The o-ring or tube itself is compressively sealed to the tubular port (protruding through the bottom of the top endplate in FIG. 15). The compressive seal prevents the leak path from progressing inside the o-ring or tube. This combination of compressive and adhesive sealing creates a convenient, tolerant, and reliable sealing arrangement.

In other embodiments, and with reference to FIG. 12, the present invention provides a manifestation of the insert molded method using separate runner/bridge components 1202. These components eliminate the need for a hole in the bi-polar plates 602. The methods described above build upon the sealing and molding steps, with improvements made in the integration of the plenums to the plates. FIG. 12 shows how bridge 1202 can cooperate with a terminal region of flow field 1208 to define a port 1204 without the need for drilling bipolar plate 1201. Moreover, the combination of bridge 1202 and the terminal region of flow field 1208 make an integral runner feature 1206, eliminating the need for plenum inserts during molding, as further described below with respect to FIG. 6. However, those of ordinary skill in the art will readily recognize that a bridge could be used in conjunction with a bipolar plate to form a port without drilling, and also without forming an integral runner feature extending from the bipolar plate.

Figure 6:
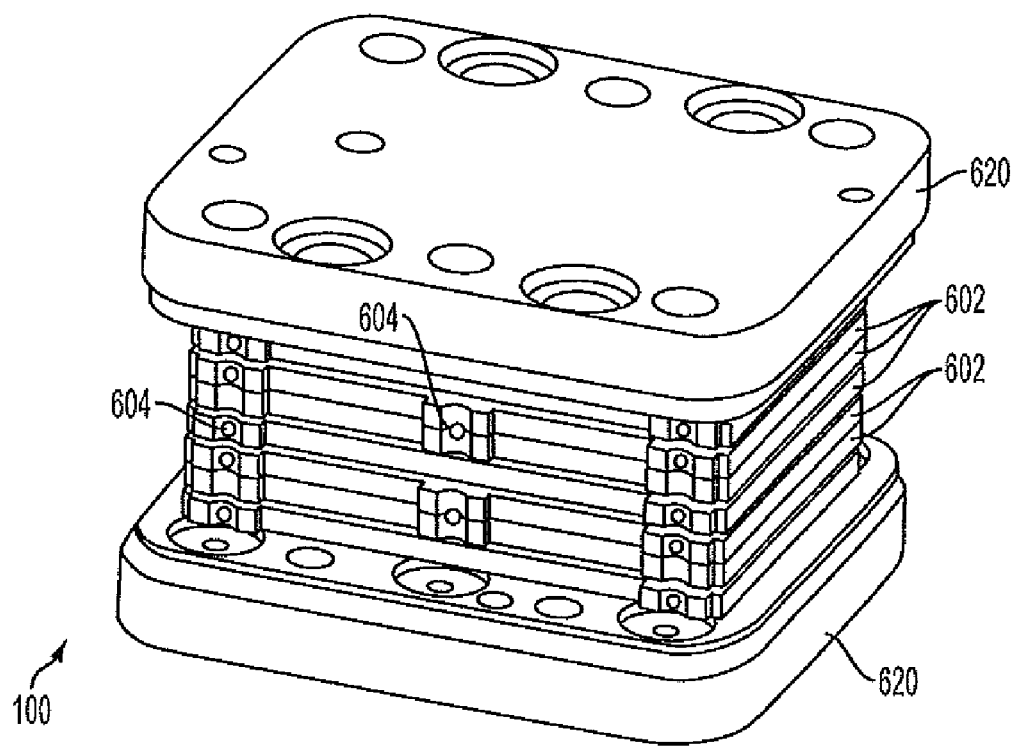
FIG. 6 shows an assembly of the stack components, without the plenum inserts.
Figure 7:
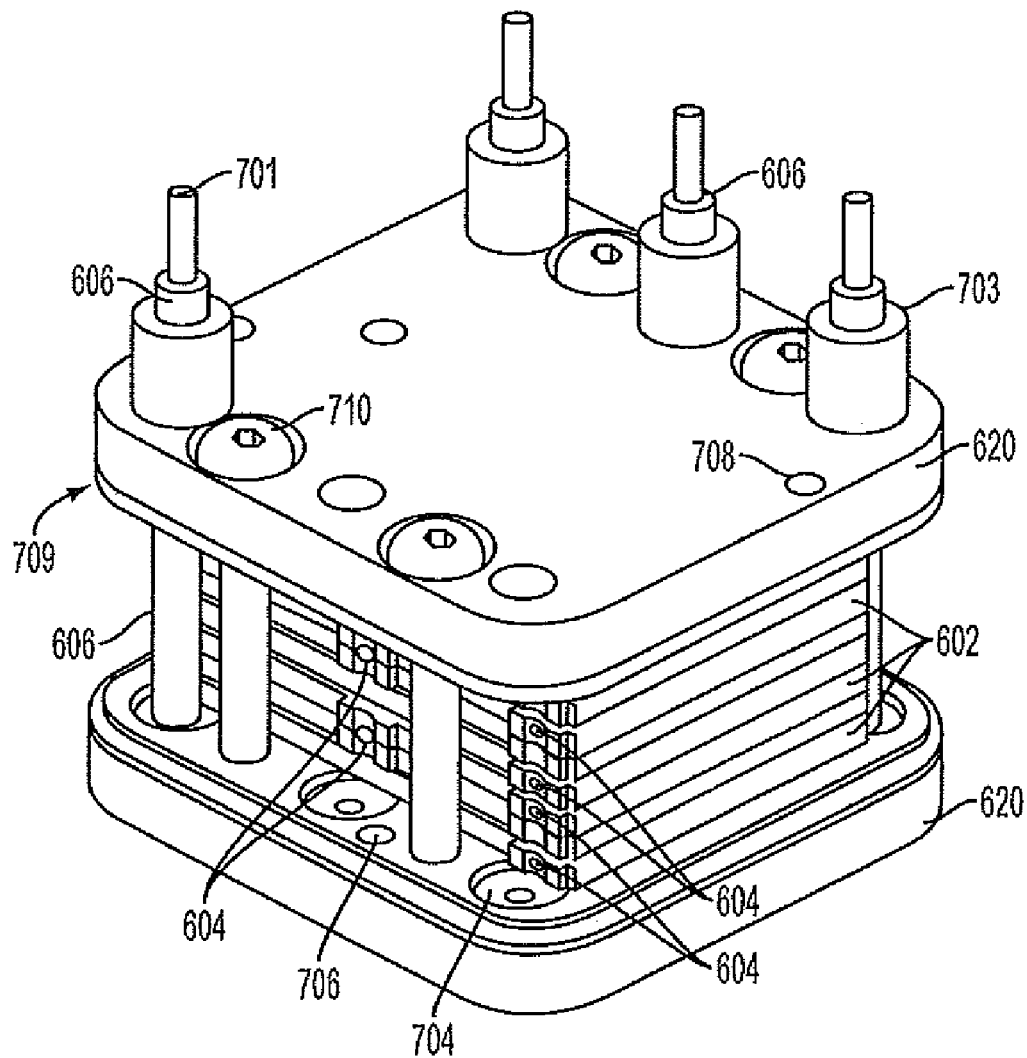
FIG. 7 shows an itemized assembly drawing of the stack with several plenum inserts.

The single-step molding method utilizes bipolar plates 602 which already contain the required runner geometry 604, as shown in FIGS. 6 and 7. Accordingly, only the plenum geometry needs to be created during the molding step. The plenums are created via vertically-inserted inserts 606 which seal against the sides of the bipolar and cooling plates 602, and which are encapsulated during molding, shown prior to molding in FIG. 7, during/after molding in FIG. 8, and after demolding in FIG. 9.

Figure 2:
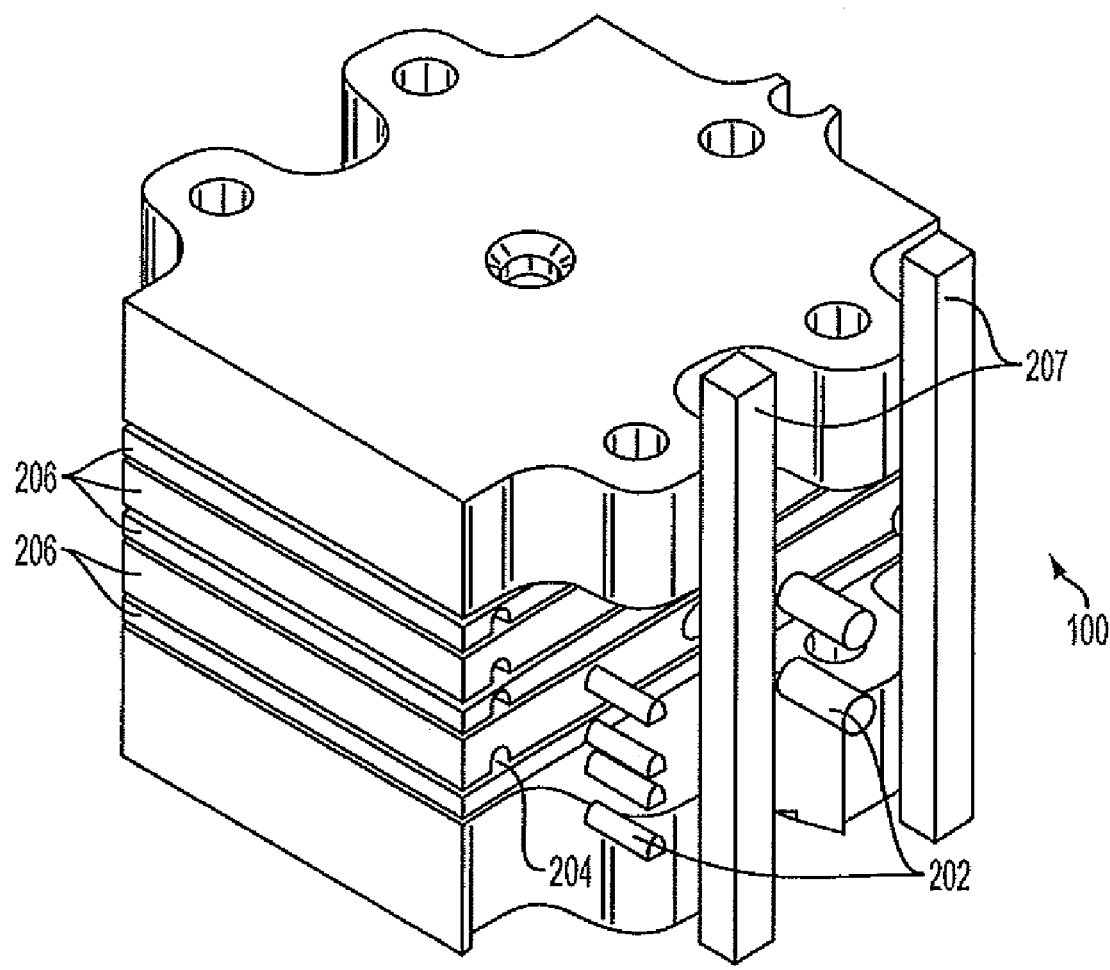
FIG. 2 displays an exploded view of the stack components with runner and plenum inserts.
Figure 3:
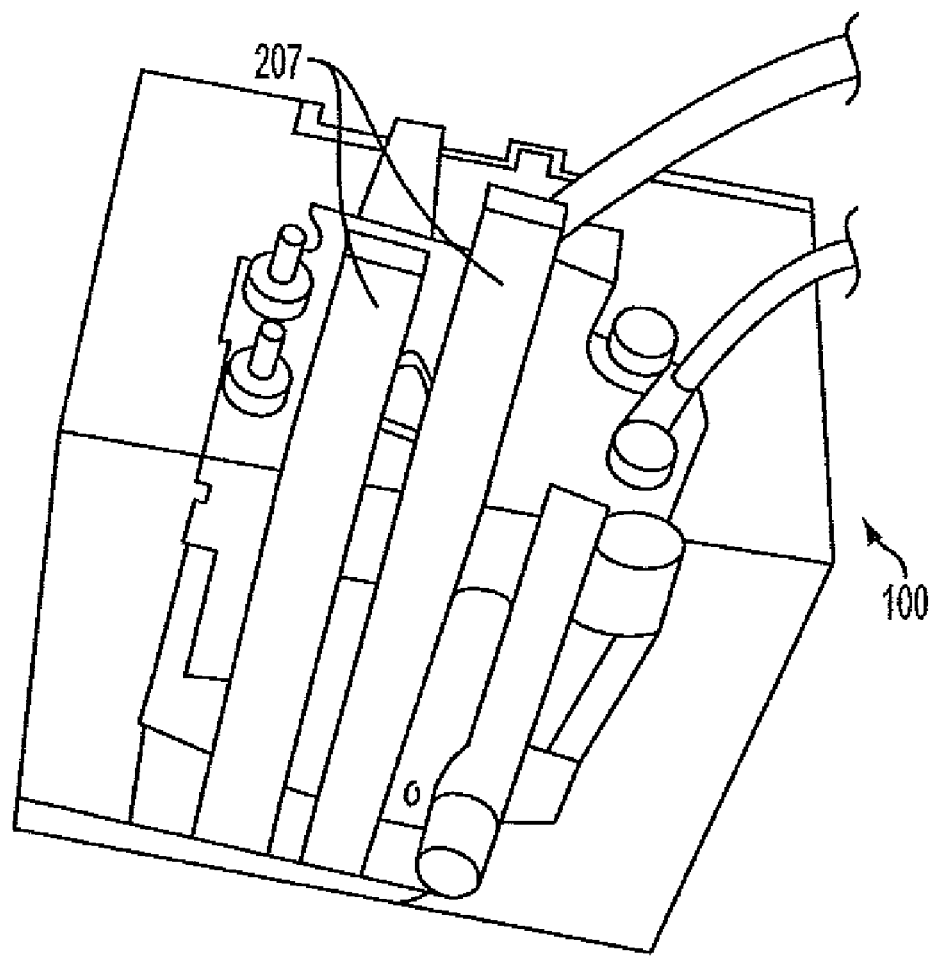
FIG. 3 is an example of a stack after the first molding step (two of six plenum inserts are remaining in this illustration).
Figure 4:
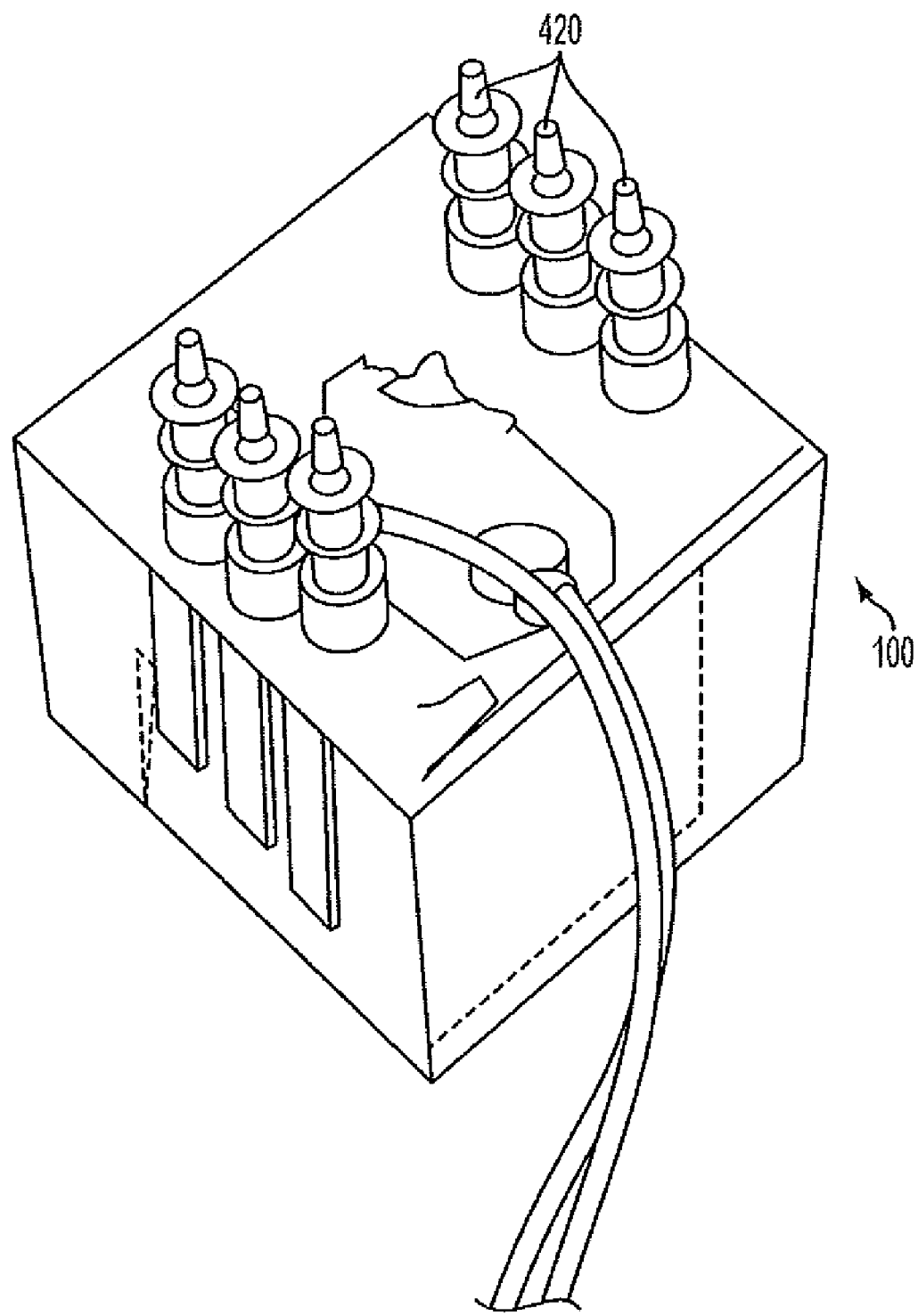
FIG. 4 shows an example of a 2-step, insert-molded stack after the final molding step.

Referring now to FIG. 2, the two-step methods involve an initial molding step where the runner geometry is molded in place via runner inserts 202 that fit inside the ports 204 in the bipolar and cooling plates 206 and extend outward from the stack components. During this step, the plenum inserts 207 are also molded in place; however the outside extent of the plenums remains open after this step due to the requirement that the runner inserts be removed horizontally out of the stack. It is also possible for the runners and plenums to be unitary as in integral plenum/runner inserts 506, shown in FIG. 5. After this initial molding step (see FIG. 3), a secondary operation (molding or adhering of components) is required to complete and enclose the plenum geometry, as shown in FIG. 4.

The current innovation allows for use of an external manifold with the 'one shot' fabrication techniques previously described. In general, flow fields (e.g. 1108, 1208) are employed with a minimum edge beyond the active area (e.g. 2-3 mm). The flow fields are open to the outside edge to provide at least one input for the respective reactants. In flow fields utilized for the cathode side of a fuel cell at least one input and one output are provided. Similarly, cooling flow fields can be employed that have at least one input and one output opening on the outside edges. Flow fields can be made from metal or carbon composites, or other materials compatible with the function of the fuel cell. A bipolar configuration of the flow field can also be utilized that includes two flow fields on either side of a single component. Membrane electrode assemblies are cut to nominally the same size and dimensions as the flow fields. The flow field and MEA components are layered together specific to the stack design (including the number of cells, number and placement of the cooling layers, etc.). These components are roughly aligned such that the MEA active area is exposed to the necessary flow fields (either within bipolar plates or as separate pieces) to form an assembly. This assembly can include any number of cells and cooling layers consisting of the necessary flow field components and MEAs relatively assembled. The resulting assembly can be held together via a clamping force for the remainder of the process (for example, by compression screw 710 shown in FIG. 7).

Typically the ports of the external manifolds and peripheral openings of the assembled stack of MEAs/bipolar plates or MEAs/flow fields/separator plates are mated together to fluidly connect each manifold to the flow fields to which they are intended to deliver (or remove) material. After assembly, a sealant resin is introduced which contemporaneously seals the junction between the ports of the external manifolds and the peripheral openings of the flow fields to which the manifold is intended to deliver a material and encapsulates the periphery of the assembled cassette.

In electrochemical cassettes of the invention which comprise a plurality of MEAs or in which the electrochemical reaction generates a substantial amount of heat, it is generally desirable to incorporate one or more coolant flow fields into the electrochemical cassette to dissipate heat generated during operation of the cassette. Although other arrangements are suitable for certain applications, the coolant flow field is typically interposed in between sets of between about 1 and about 8 MEA layers, or more preferably between sets of 2, 3, 4, 5, or 6 MEA layers. In electrochemical cassettes comprising at least one coolant flow field, each reductant external manifold and each oxidant external manifold comprises a primary manifold conduit and at least one port capable of mating with peripheral openings of an equal number of flow fields to which the manifold is intended to deliver material; and each coolant external manifold comprises a primary manifold conduit and at least one port capable of mating to peripheral openings of an equal number of coolant flow fields.

Also contemplated by the instant invention is an electrochemical cassette comprising, at least one electrochemical cell which comprises a membrane electrode assembly (MEA), a reductant flow field, an oxidant flow field, a separator plate, at least one reductant external manifold and at least one oxidant external manifold, wherein each flow field comprises at least one opening (e.g. 204, 1204) extending through the periphery of the cell and each external manifold comprises a primary manifold and at least one port in fluid contact with the peripheral openings in the flow field to which the external manifold is intended to deliver material, wherein the one or more MEA, oxidant flow field, reductant flow field, and separator plate, are assembled and encapsulated about the periphery thereof by a sealant; wherein each external manifold is a volume at least partially bounded by the sealant and wherein the volume is in contact with the peripheral openings in the flow field to which the external manifold is intended to deliver material; and wherein each external manifold comprises a primary manifold (e.g. 1110 in FIG. 11) which consists of a single conduit having a substantially uniform cross section along the length thereof.

The novel design of the externally manifolded electrochemical cassettes of the invention results in a larger percentage of the MEA surface area being utilized for the electrochemical reaction and smaller cassettes (e.g., overall cassette size and weight) for a given cassette capacity. The cassette design provided herein simplifies the manufacture and assembly of the components of the cassette. In accordance with the invention, the active surface area of the cassettes is increased significantly. In particular, the separator plates (or bipolar plates) and MEAs do not require any holes or other apertures extending through the thickness thereof as is the case with fuel cell assemblies utilizing internal manifolding.

Cassettes of the invention include one or more plates comprising one or two reagent flow fields having at least one and preferably two openings to each reagent flow field about the periphery of the plate. More specifically, the plates comprise at least one and preferably two openings per reagent flow field which are capable of forming a fluid tight seal with a port of an external manifold when the stack is encapsulated with a resin. Preferably, the peripheral openings of the flow fields or plates and the ports of the manifold are shaped such that they facilitate stack assembly and formation of a fluid tight seal when pressure or vacuum is applied during resin encapsulation.

The following is a brief description of certain innovations described in US20040247982A1, included here as reference: A. Cassettes of the invention comprise a preformed external manifold which is manufactured or assembled such that the ports of the manifold can mate with corresponding peripheral openings in the assembled stacks of separator plates, flow fields, and MEA to form the cassette. B. To the clamped assembly of fuel cell components, separate manifold pieces are added to connect all the openings corresponding to a particular reactant input or output on each of the layers. These manifold pieces can be machined from a solid stock, cast from any number of materials, or molded from a suitable resin. C. In general, these manifold pieces need to fit snuggly to each of the stack components with which it interfaces. D. The external manifold is assembled by providing a primary manifold tube, hose, or pipe, placing a series of openings through the side wall of the primary manifold and inserting hosing, pipes or tubings for the ports in the openings. Preferably the port tubing inserted into the manifold openings has substantially the same diameter such that the connection between the ports and the primary manifold is fluid tight or is fluid tight after encapsulating the fuel cell with resin. Although any material which is chemically stable to the sealant and the reactants, e.g., oxidant and/or fuel, are suitable for use in the preparation of the external manifold opening, preferred materials are non-conducting resins which have are sufficiently flexible to facilitate stack assembly. Typically preferred manifold materials are selected from silicone, Teflon, polyethylene, Tygon tubing, butyl rubber, and the like. E. For use in fuel cell applications, cassettes of the invention are typically utilized in the form of a stacked assembly comprising the following components: membrane electrode assemblies (MEA), flow fields, separator plates and external manifolds. Preferably the stacked assembly is then encapsulated in a resin to bind the MEA and separator plates and to seal the external manifolds to the separator plates or flow fields forming a conduit between the manifolds and at least some of the flow fields. In preferred embodiments, one or two flow fields and a separator plates are provided in a single bipolar plate which is then stacked with MEA layers and other bipolar plates.

With respect to the description above, the present invention allows for significant improvements in manufacturability and performance. Due to the elimination of the manifolds as separate components, parts count is significantly reduced. The precision manufacturing steps in making the manifolds are eliminated. Small parts handling is significantly reduced by the elimination of the runner and plenum insertion and attachment steps. In addition, the resulting flow geometry from the plenums through each runner is more consistent from cell to cell because the runner function is accomplished with a drilling or molding step during the bipolar plate manufacture, as opposed to manual assembly of small tube components.

The externally manifolded stack assembly is placed within a cavity mold and a resin is introduced around the components. The resin is driven into the edges of the stack assembly either by pressure applied from the outside of the stack, or by a vacuum applied to the stack internal (i.e. through each of the manifolds). Once hardened, either by cooling of a thermoplastic resin or curing in the case of a thermoset resin, the encapsulated fuel cell stack can be removed from the mold. The resin serves both to seal the edge of each MEA, as well as to bind together all of the stack components, including the manifold pieces.

The final encapsulation can also include end plates (such as end plates 120 shown in FIG. 1, end plates 620 shown in FIGS. 6 and 7, and end plates 1520 shown in FIG. 15) and current collector pieces allowing for further integration of the assembly process, as well as reliability of the end product. End plate components can include features to compress the stack component parts, either before, during or after the encapsulation steps. Because the fuel cell is fabricated without the need for separate gaskets, the compression required is only a fraction of that in a traditional fuel cell stack, and is used to maintain good electrical contact.

Fuel cells of the present invention provide several advantages over conventional devices which include, but are not limited to the following: The majority of the component area is actively used in the assembly, i.e. only a small portion is used in the sealing/manifolding of the stack, such that at least 80% or more preferably between 85% and about 95% of the MEA cross-section is actively used for the electrochemical reaction; continuously coated MEAs can be readily used (i.e. compatible with roll-to-roll processing of MEAs); encapsulation of all the components within the stack provides robust product; component pieces can be fabricated with very relaxed tolerances as sealing does not require gaskets and compression; reducing or preventing corrosion in the stack by segregating the reactant streams from the end plates or collector plates; reducing or preventing problems associated with exposure of the MEA to non-aqueous coolants by segregating the coolant streams from the composite MEAs.

Preferably, all of the fuel cell components are cut to roughly the same shape perimeter. In preferred embodiments the MEA layer is a solid sheet without cuts or other holes or channels through the thickness thereof, the bipolar plate(s) have one or two flow fields on opposing faces, and at least two apertures per flow field about the periphery of the bipolar plate which are open to each flow field. Preferably the apertures are capable of coupling to a port in an external manifold to form a tight seal, thereby excluding the sealant.

Due to the porous nature of the gas diffusion layer (GDL) of the MEA, sealant introduced into the periphery of the MEA and bipolar plate interpenetrates the GDL to seal the MEA and the bipolar plate together and seals the bipolar plate aperture to the port of the external manifold. In conventional processes, the polymer membrane is often required to extend past the GDL to provide a frame for sealing purposes. Consequently, this results in increased manufacturing costs. In contrast, in accordance with the present invention, sealing is achieved with a GDL and polymer membrane that are of substantially the same size and shape. This is advantageous as the MEAs used in the present invention may be fabricated on a continuous basis with the associated reduction in manufacturing costs.

In certain applications, particularly where an increased amount or more homogeneous distribution of material to flow fields is desired, the invention contemplates electrochemical cassettes, in which, flow fields are in fluid contact with two or more external manifolds delivering material and two or more exhaust manifolds. The electrochemical cassette designs provided herein provide for multiple manifold-flow field connections, in part because of the ease of cassette assembly and the low cross-sectional area required for the flow field opening to individual external manifolds. Thus, the cassettes of the invention may in certain instances incorporate a plurality of material delivery and/or exhaust external manifolds which are in fluid contact with each flow field of the stack.

Although exemplary assembly designs have been described, those skilled in the art will recognize that fuel cells can have any desired number of components assembled together depending upon the output requirements of the final fuel cell cassette. Regardless of the particular design, the components are assembled to meet the requirements of the finished fuel cell. In each case, external manifolds having ports which are of a size and alignment suitable for coupling to each of the apertures to equivalent flow fields in each of the bipolar or separator plates/flow fields are then aligned with the stack assembly to form a seal with each of the flow fields.

To seal the fuel cell cassette assembly described above using vacuum resin transfer molding techniques, the mold insert materials and geometry are selected to allow for fluid communication to the reductant, oxidant and cooling geometry within the fuel cell cassette assembly. Then, a sealant is introduced around the perimeter of the assembled components. A vacuum is pulled through each of the external manifolds within the assembly. The pressure differential pulls sealant into the edges of the assembly thereby sealing the periphery of the components in the assembly together and forming the assembly into a finished fuel cell cassette. Sealant also permeates the GDLs of the MEAs. The perimeter sealing is complete when the sealant binds the adjacent portions of the MEA.

To seal a fuel cell cassette using injection-molding techniques, sealant would be injected around the periphery of the assembly including the external manifolding using a driving pressure means. The sealant is not introduced into the interior conduits of the external manifolds or into the flow fields which are open to the interior conduits of the external manifolds. In the preferred embodiment, a thermoplastic resin is utilized as the sealant around the edges of the assembly and allowed to cool and harden prior to removal of the fuel cell cassette from the mold. A mold capable of accommodating the associated temperature and pressure is utilized. Alternatively, a thermoset resin can be used in the same manner; curing with any suitable combination of time and temperature.

The pressure differential and time required to accomplish the sealing process is a function of the materials used in the fuel cell cassette construction. These include the viscosity and flow characteristics of the resin, and the type of gas diffusion layer used in the MEA. Those skilled in the art will be able to judge the appropriate time and pressure based on these parameters. Those practicing the invention may also ascertain the most appropriate time and pressure by visual inspection during the sealing process.

The resin or sealant used for encapsulation is selected such that it has the required chemical and mechanical properties for the conditions found in an operating fuel cell system (oxidative stability, for example). Appropriate resins/sealants include both thermoplastics and thermoset elastomers. Preferred thermoplastics include thermoplastic olefin elastomers, thermoplastic polyurethanes, plastomers, polypropylene, polyethylene, polytetrafluoroethylene, fluorinated polypropylene and polystyrene. Preferred thermoset elastomers include epoxy resins, urethanes, silicones, fluorosilicones, and vinyl esters.

In certain preferred embodiments, endplates (e.g. 120, 620, 1520) are bonded directly to the stacked assembly of MEA layers and bipolar plates during the sealing steps described above. Alternatively, the end plates can be modified bipolar plates having a flow field on one surface and electrical leads and/or various adapters on the other surface. Several benefits result from the use of this embodiment. Removing the compression seal between the fuel cell cassette and conventional end plates improves the reliability of the fuel cell stack and substantially decreases the weight. Also, the incorporated end plates can include a variety of fittings to further simplify the fuel cell stack.

In a preferred embodiment of the invention, vacuum- or pressure-assisted resin transfer molding is used to draw or push the sealant (introduced from the external edge outside the stack) into the peripheral edges of the MEAs and around bipolar plates and manifolds. Preferably the sealant forms a non-porous composite with that portion of the GDL in contact with the external edge of the MEA and with the bipolar plate such that the seal is liquid or gas tight. This embodiment of the invention is preferred in that it offers ease in terms of manufacturing and is therefore a preferred sealing means for large volume manufacture of fuel cell cassettes.

Preferred composite membrane electrode assemblies suitable for use in the fuel cell cassettes of the invention comprise a laminated membrane electrode assembly including membrane, catalyst layers and gas diffusion layers. Suppliers include 3M, DuPont, Johnson Matthey, W. L. Gore, Umicore, E-Tek, PEMEAS among others.

Preferred cassettes suitable for use in electrochemical and fuel cell applications further include at least two current collectors which are preferably integrated into the endplates. Thus, in preferred cassettes, at least a portion of one of the end plates is composed of an electrically conductive metal or metal alloy. More preferably, at least a portion of one of the end plates is a copper current collector. The means by which the end plates and fuel cell cassettes are assembled to form the fuel cell stack provided by the present invention is not particularly limited and may include compression gasket seals, o-rings, or co-encapsulation in a resin and/or sealant. In preferred embodiments, the end plate is assembled with the fuel cell cassette prior to encapsulation by the resin and prior to introduction of the sealant such that the end plate and fuel cell cassette are encapsulated and sealed in combination, e.g., simultaneously.

In other preferred embodiments of the present invention, one or more fuel cell cassettes are manufactured, then aligned in a stack together with one or more compression gaskets and end plates. Compression means such as through bolts (e.g. 710 in FIG. 7), tie downs or other mechanical fasteners are attached to the fuel cell stack to mechanically seal the fuel cell cassettes and end plates.

In preferred embodiments, the external manifolds of individual cassettes are capable of forming liquid or gas tight seals with adjacent external manifolds of other cassettes.

The layer size and number of layers in the cassettes and stacks of the invention are not particularly limited. Typically each flow field and/or membrane assembly will be between about 1 cm$^2$ and about 1 m$^2$. However, as will be appreciated by the skilled artisan, larger and smaller flow field layers and/or membrane assembly layers may be suitable in certain applications. The layer size and number of layers the fuel cell cassettes and fuel cell cassettes of the invention are capable of producing a sufficient power supply for a variety of applications. Frequently, the power output of fuel cell cassettes and fuel cell stacks of the invention will range from about 0.1 W to about 100 kW, or more preferably, from about 0.5 W to about 10 kW.

The fuel cells of the invention offer improved corrosion resistance and increased operation lifetime due, in part, to spatial separation of the collector/end plates from reagents manifolds. The external manifolds deliver the fuel and oxidant to the reagent flow fields through a manifold that is segregated from the collector plates and composite MEA. The corrosion of the current collectors, which are formed from a conductive metal or metal alloy, is prevented by isolating reagents capable of oxidizing or otherwise reacting with the current collectors to the external manifolds and the flow fields to which the manifolds deliver material. Similarly, separating the reagent manifolds from the MEA prevents exposing both surfaces of the MEA to the reagents flowing through the manifolds and thus prevents cross-cell potential problems associated with many conventional fuel cell designs. In addition, contact between the MEA and the coolant fluid is avoided.

Any conventional MEA is suitable for use in the fuel cell stacks of the present invention. Moreover, square, circular, rectangular or other regular shaped MEA having nominally the same cross section as the reagent flow field plates or bipolar plates are suitable for use in the fuel cell stacks of the present invention. Composite MEAs are suitable for use in the cells of the invention without additional modification, e.g., additional openings in the MEA structure or incorporation of a non-conductive gasket are not required. Incorporation of a substantially homogenous composite MEA which has substantially the same cross-section as the flow fields and/or separator plates maximizes the portion of the MEA available for use in electrochemical reactions.

The improved fuel cell stack of the present invention can be manufactured from conventional fuel cell components and can utilize both injection molding and vacuum assisted resin transfer molding, and pressure assisted resin transfer molding processes.

The present invention allows for the fabrication of fuel cell stacks with a minimum of labor, thereby dramatically reducing their cost and allowing for process automation. In addition, in the present invention the ports are sealed by adhesion of the sealant to the fuel cell components, not by compression of the endplates or other means of compression. This reduces the compression required on the final stack, thus improving the reliability of the seals, improving electrical contact and allowing for the use of a wider variety of resins. Further, end plates may be molded into the fuel cell cassette thereby producing an entire stack (e.g., fuel cell cassette and end plates) in one step.

Preferred fuel cell cassettes of the present invention are further illustrated by means of the following illustrative embodiment, which is given for purpose of illustration only and is not meant to limit the invention to the particular components and amounts disclosed therein.

EXAMPLES

The present invention provides a variety of cassettes suitable for use in electrochemical applications and ion exchange applications. As noted above, cassettes of the invention are particularly well suited for use in fuel cells.

Example 1

Two-Step Molding Methods

In general, the two-step methods involved an initial molding step where the runner geometry was molded in place via runner inserts that fit inside the ports in the bipolar and cooling plates and extend outward from the stack components. During this step, the plenums were also molded in place; however the outside extent of the plenums remains open after this step due to the requirement that the runner inserts be removed horizontally out of the stack. After this initial molding step, a secondary operation (molding or adhering of components) was required to complete and enclose the plenum geometry.

Example 2

Separate Runner and Plenum Inserts

Removable inserts were used during the molding process to form both the runner and plenum geometry. The runner inserts were inserted into ports in the sides of the bipolar and cooling plates to seal out the sealant compound from the interior regions of the stack. Separate individual inserts were used to form the runners, and the plenums were formed by separate inserts that physically contact the runner inserts to form a molding seal.

For the first molding step, the plenum inserts were typically constrained on the outside by the interior walls of the mold itself. After the initial molding, curing, and de-molding was complete, the plenum inserts were first removed from the exterior walls of the stack. This allows access to the runner inserts which may be individually removed.

FIG. 2 displays an exploded view of the stack components with runner and plenum inserts. FIG. 3 is an example of a stack after the first molding step (two of six plenum inserts are remaining in this example).

Example 3

Discrete Runner/Bridge Components

In other embodiments, the plates do not have the runner geometry. Instead, the plates had a void to accept a runner/bridge component which is a separate component. This component shuts off the silicone sealant from entering the runner and provides for the bridging function at the edge of the MEA. The advantage of this construction is that the plates do not need to have any through hole features and do not need tight tolerances. The runner/bridges were made from thermoplastics, thermoplastic elastomers, thermoset elastomers or any other material desired. The runner/bridges had features to facilitate sealing to the bi-polar plates as well as the plenums. These runner/bridge components can accommodate larger tolerances than the integral bi-polar plate runner concept.

After the first molding step was completed and the inserts were removed, there were two basic techniques that may be employed to complete the plenum geometry. In the first technique, pre-formed components were adhered to the surface of the stack to close off the exposed face of the plenums. These components may be as simple as flat sheets of plastic or metal which cover the open sides of the plenums and are sealed around their perimeter. Alternately, the components may be partial tubes or other partially-closed shapes which are adhered to the surface of the stack.

In the second technique, a second molding step was used to create the remainder of the plenum geometry. Typically, a separate, larger mold was used to allow for the molding compound to form the remaining side of the plenum around the plenum inserts. The plenum inserts were re-installed after the removal of the runner inserts. The stack was then molded again to form the remainder of the plenum geometry.

FIG. 4 shows an example of a 2-step, insert-molded stack after the final molding step. In this figure, tubes 420 were molded in place at the top of the stack as a transition to connecting to standard tubing components; however various interfaces or fittings may be molded in place. After the molding step, the plenum inserts were simply removed vertically and replaced with the fittings seen in the complete stack.

Example 4

Integrated Runner/Plenum, Single-Component Inserts

In another aspect, the method was identical to the method of example 1, except that a set of inserts with both plenum and runner geometry was employed in the first molding step. These inserts were removed horizontally from the sides of the stack. Using this technique, assembly and de-molding steps are simplified through reduced small parts handling and a lower parts count.

Figure 5:
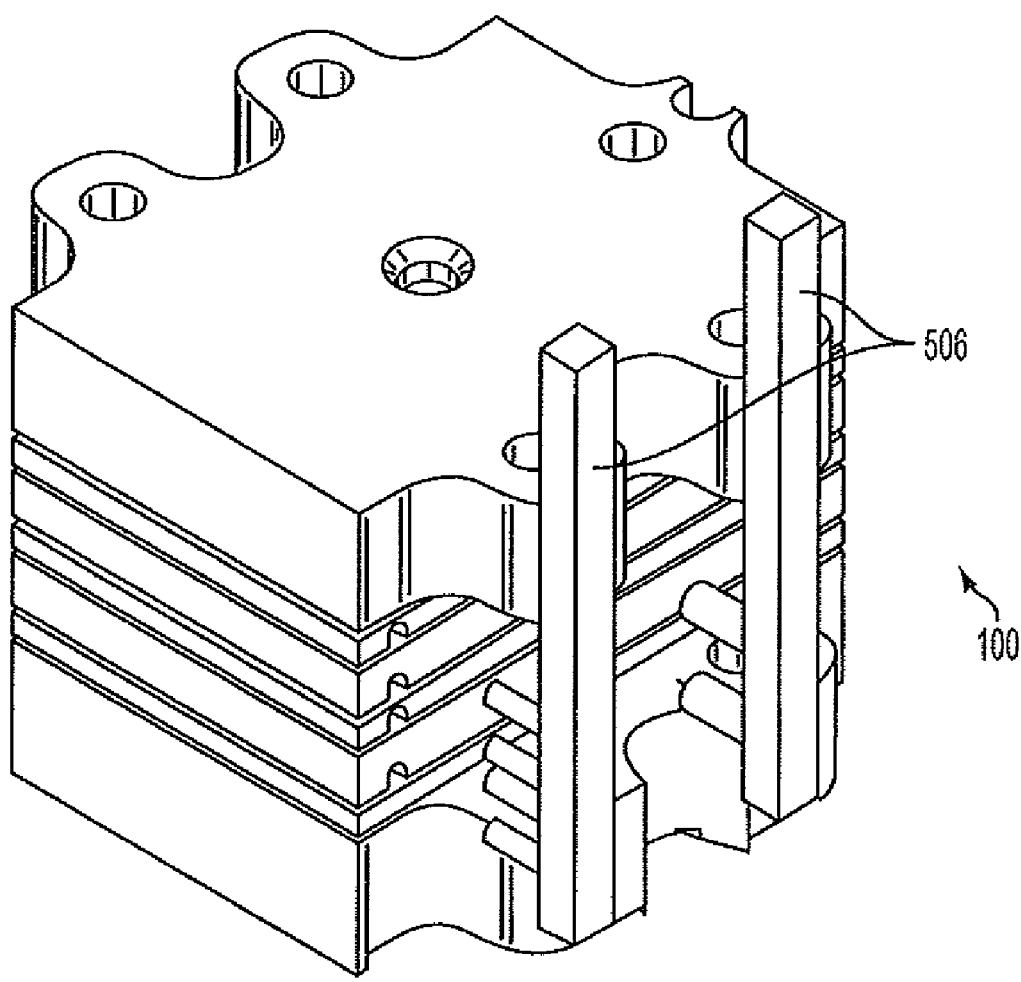
FIG. 5 shows the stack components and the integral runner/plenum inserts in an exploded view.

FIG. 5 shows the stack components and the integral runner/plenum inserts 506 in an exploded view. As previously described, the runner inserts were inserted into the ports in the sides of the bipolar and cooling plates to seal out the molding compound from the interior regions of the plates.

After the first molding step was completed, the second step options were identical to the methods for the separate runner/plenum inserts. Inserts with only plenum geometry (no runners) must be employed if the plenums are completed with a secondary molding step. Alternately, use the integral runner/plenum inserts to mold a stack in a single step was accomplished if the inserts were made to be collapsible or flexible enough to allow for the runner inserts to be removed through the molded plenum geometry at the de-molding step.

Example 5

Single-Step Molding Using Bipolar Plates with Integral Runner Geometry

The single-step molding method utilized bipolar plates which already contained the required runner geometry. Accordingly, only the plenum geometry needs to be created during the molding step. The plenums were created via vertically-inserted inserts which seal against the sides of the bipolar and cooling plates, and which were completely encapsulated during molding.

Example 6

Bipolar Plates with Integral Runners with Plenum Inserts

FIG. 6 shows an assembly of the stack components, without the plenum inserts. The holes forming the runner geometry in the sides of the bipolar and in the cooling plates are visible in this view.

FIG. 7 shows an itemized assembly drawing of the stack with the plenum inserts. Rod insert 701 provides the insert with stiffness throughout its length so as to allow for the elastomer tube 606 to be sufficiently supported to ensure a seal against each bipolar plate layer. The elastomer tube serves to create the inside diameter of the molded plenum as well as to provide for some flexibility in sealing off each individual layer during the molding step. This flexibility allows for normal production tolerances and slight misalignments of components. Top port 703 may be a silicone tube or other connection that serve as the process ports for the fuel cell stack. Top port 703 preferably can adhere to the molding compound of the stack to form a continuous plenum without mechanical or compressive seals. Reference numeral 620 refers to the compression plates (or endplates) of the fuel cell stack. End plates 620 have some geometry to allow for the aligning of the plenum inserts such as plenum alignment feature 704, fill holes 706 and vent holes 708 to facilitate the molding process.

The stack manufacturing process was somewhat flexible; a typical example follows:

1. Assemble all components of the stack (bottom endplate, bipolar plates, cut-to-size MEAs, current collectors (if used), top endplate, compression screws and hardware, sealing rings (e.g. sealing ring 709). Use various aligning fixtures as necessary to eliminate interferences. Insert compression screws and hardware; tighten slightly (hand tight).

2. Insert elastomer tubes over the rod inserts and then insert the tube/insert into the holes in the top endplate.

3. Insert the top ports over the inserts and down into the top endplate.

4. Tighten compression screws to specified value.

5. Assemble the mold and insert the stack

6. Inject the molding compound until the vent holes barely spill over

7. Cap the vent holes and apply the specified time/pressure to the molding compound 8. Remove molding equipment, plug the fill hole on the mold, plug the vent holes on the top endplate 9. Cure the stack in the mold for a specified time and temperature 10. Remove the stack from the mold, remove the plenum inserts As an alternative, part of step 7 (capping the vent holes) can be eliminated if the vent openings in the mold are lined with an air-breathing, resin-blocking membrane. In this embodiment, the vent openings act as vents until the injected resin completely coats the membrane surface lining the opening. Once the membrane is fully coated, it forms a pressure-tight seal for the remainder of the molding and curing process.

Another alternative is to substitute vacuum-assisted transfer molding in place of the pressure-assisted method in step 7. In this case, a vacuum is applied to the manifolds of the fuel cell stack at the completion of the mold filling. The vacuum is applied for a suitable time and magnitude to create the sealing interfaces in the stack. When utilizing this method, the mold inserts forming the plenums and/or runner geometry must be in fluid communication with their respective flow fields within the stack. One method for accomplishing this is to utilize bipolar plates and separator plates with fully-integrated runner geometry (Example 6 above) and plenum inserts wrapped or sheathed in an air-breathing membrane. The membrane must not allow the molded resin to pass through the membrane. The vacuum is then applied through the plenum inserts after the mold is filled completely and the membrane surface is completely coated in resin except where it is in fluid communication with the ports of the bipolar and separator plates of the fuel cell stack.

Figure 8:
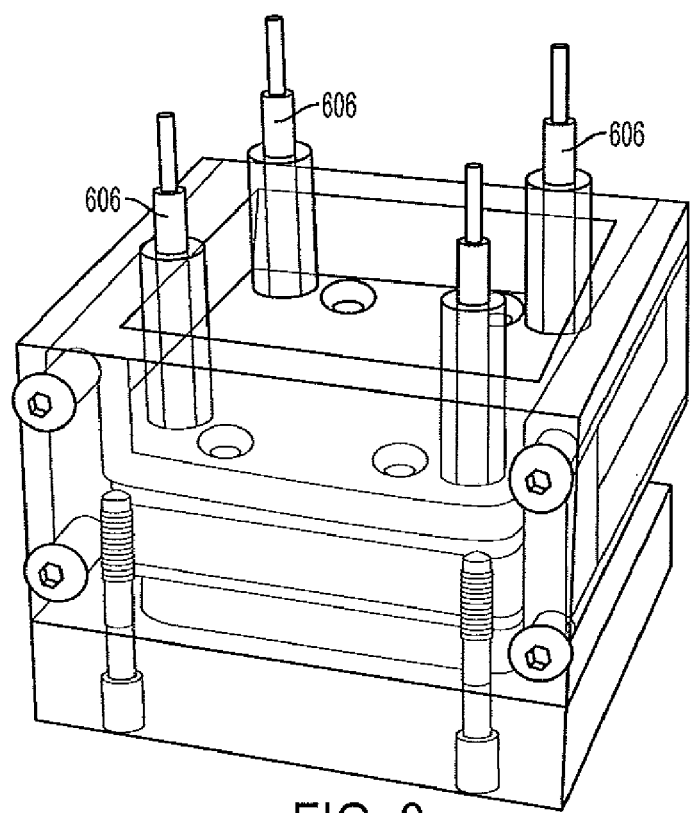
FIG. 8 shows the stack, as-molded, still in the mold with the plenum inserts still in place.
Figure 9:
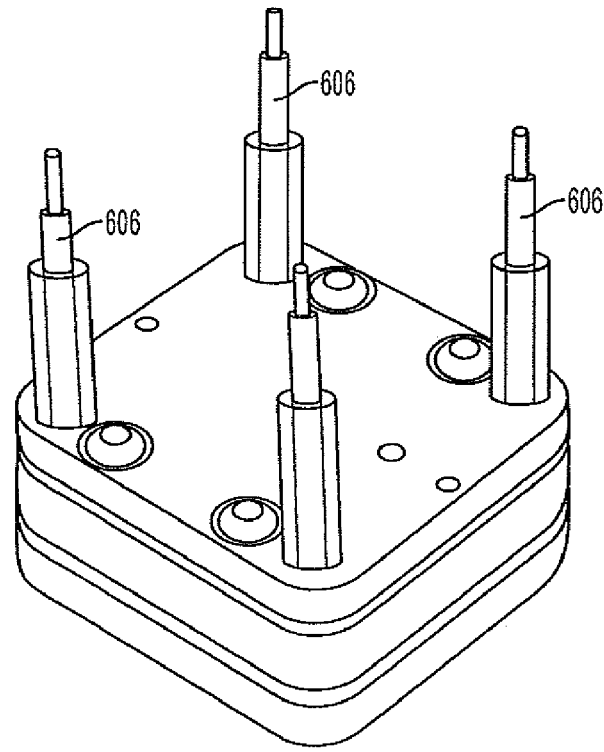
FIG. 9 shows the stack after de-molding with the plenum inserts still in place.
Figure 10:
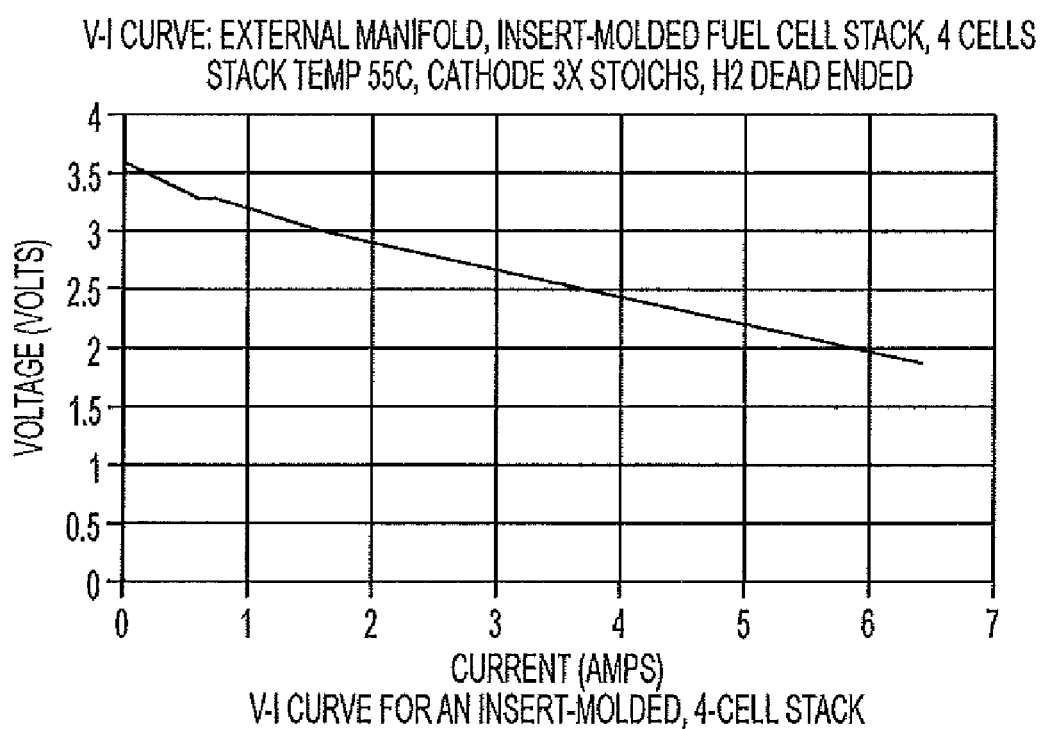
FIG. 10 shows the voltage currant (V-I) curve for the stack shown in FIGS. 8 and 9.

FIG. 8 shows the stack, as-molded, still in the mold. The plenum inserts are still in place. FIG. 9 shows the stack after de-molding. A similar stack to that shown in FIG. 9 was constructed and tested. This stack had 4 cells and 2 cooling layers. The stack was found to be leak-free. The V-I curve for this stack is shown below in FIG. 10. FIG. 11 is a cutaway stack showing the integral plenums that are formed by the inserts during the molding process. FIG. 12 shows a method of making the integral runner, bipolar plates with a discrete bridge component allowing for bipolar plates with no undercuts. This design allows for the construction advantages of bipolar plates with integral runners and plenum inserts and simplified bipolar plate manufacture. The plates do not have the undercuts necessary to form the integral runners and therefore can be made from a simplified molding, machining or stamping process without tight tolerances. The discrete bridge components could be made from any suitable material including thermoplastic elastomers. This variation of the integral runner bipolar plate construction has various manufacturing and cost advantages.

It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

What is claimed is:

1. A fuel cell stack comprising:
a) at least one fuel cell including:
   i) a membrane electrode assembly;
   ii) a reductant flow field disposed proximate a first side of the membrane electrode assembly, the reductant flow field including a reductant flow channel extending to a periphery of the fuel cell;
   iii) an oxidant flow field disposed proximate a first side of the membrane electrode assembly, the oxidant flow field including an oxidant flow channel extending to the periphery of the fuel cell;
b) a unitary plenum housing formed about the periphery of the fuel cell, the unitary plenum housing at least partially defining:
   i) a reductant manifold in fluid communication with the reductant flow channel, the reductant manifold and the reductant flow channel cooperating to form a reductant plenum; and
   ii) an oxidant manifold in fluid communication with the oxidant flow channel, the oxidant manifold and the oxidant flow channel cooperating to form an oxidant plenum, wherein at least one of the reductant and oxidant manifolds includes a portion of sealant having a negative impression of a manifold insert defining a volume at least partially bounded by the sealant.

2. The fuel cell stack of claim 1, wherein:
a) the fuel cell further includes a coolant plate in thermal communication with the membrane electrode assembly, the coolant plate including a coolant flow channel extending to the periphery of the fuel cell; and
b) the unitary plenum housing further defines a coolant manifold in fluid communication with the coolant flow channel, the coolant manifold and the coolant flow channel cooperating to form a coolant plenum.

3. The fuel cell stack of claim 2, wherein the unitary plenum housing defines at least one of (i) the reductant manifold, (ii) the oxidant manifold and (iii) a coolant manifold in cooperation with a portion of the periphery of the fuel cell.

4. The fuel cell stack of claim 1, wherein at least one of (i) the reductant manifold, (ii) the oxidant manifold and (iii) the coolant manifold is not defined by the periphery of the fuel cell.

5. The fuel cell stack of claim 1, wherein the fuel cell stack includes a plurality of fuel cells electrically connected in series.

6. The fuel cell stack of claim 1, wherein the reductant flow field and oxidant flow field are each integrally formed into a separator plate, the separator plate being chosen from the group consisting of (i) a bipolar plate and (ii) a cooling plate.

7. The fuel cell stack of claim 6, wherein the separator plate includes material selected from the group consisting of (i) a carbon/polymer composite material, (ii) graphite and (iii) metal.

8. The fuel cell stack of claim 6, wherein the separator plate is stamped from a metal sheet.

9. The fuel cell stack of claim 7, wherein the graphite includes graphite tape.

10. The fuel cell stack of claim 1, further comprising a first end plate at a first end of the stack and a second end plate at the second end of the stack.

11. The fuel cell stack of claim 10, wherein at least one of the end plates includes recesses formed therein proximate an extremity of one of the manifolds, the recess being adapted and configured to receive a removable mold when the plenum housing is being formed.

12. The fuel cell stack of claim 1, further comprising an electrical current collector electrically coupled to the membrane electrode assembly.

13. The fuel cell stack of claim 7, wherein each separator plate defines a contoured feature proximate a port of a flow channel at the periphery of the fuel cell, the contoured feature being adapted and configured to mate with a removable mold when the plenum housing is being formed.

14. The fuel cell stack of claim 13, wherein the contoured feature is substantially concave in shape and is adapted to receive a mold that is substantially cylindrical in shape when the plenum housing is being formed.

15. The fuel cell stack of claim 10, wherein one of the end plates includes a fill hole and the other end plate includes a vent hole to facilitate forming the plenum housing by way of a molding process.

16. The fuel cell stack of claim 2, further comprising a vapor barrier insert disposed proximate at least one of the oxidant, reductant and coolant manifolds, the vapor barrier insert being adapted and configured to reduce egress of fluids through a periphery of the fuel cell stack.

17. The fuel cell stack of claim 16 further comprising a vapor barrier layer disposed proximate the external periphery of the plenum housing, the vapor barrier layer being adapted and configured to reduce egress of fluids through a periphery of the fuel cell stack.

18. The fuel cell stack of claim 1, wherein at least one of the manifolds has a tapered configuration from a first end of the manifold to a second end of the manifold.

19. The fuel cell stack of claim 18, wherein the tapered manifold has a smaller transverse dimension that enlarges to a larger transverse dimension along a length of the manifold toward an external port of the fuel cell stack.

20. The fuel cell stack of claim 1, further comprising a tubular insert integrally formed into one end of one of the manifolds, the tubular insert made from a material that is compatible with the material of the plenum housing, wherein the tubular insert forms a portion of a fluid flow path including the manifold to which it is attached.

* * * * *

UNITED STATES PATENT AND TRADEMARK OFFICE
CERTIFICATE OF CORRECTION

PATENT NO. : 7,887,974 B2  Page 1 of 1
APPLICATION NO. : 11/784941
DATED : February 15, 2011
INVENTOR(S) : Paul Osenar et al.

It is certified that error appears in the above-identified patent and that said Letters Patent is hereby corrected as shown below:

Column 5, Line 4, delete "first" and replace with -- second -- line to read:
oxidant flow field disposed proximate a -- second -- side of the Column 7, Line 28, delete "first" and replace with -- second -- line to read:
cell, and an oxidant flow field disposed proximate a -- second -- side

**Column 26, Claim 1, Line 3 of item iii), delete "first" and replace with -- second -- item iii) to read:

iii) an oxidant flow field disposed proximate a -- second -- side of the membrane electrode assembly, the oxidant flow field including an oxidant flow channel extending to the periphery of the fuel cell;

Signed and Sealed this
Twentieth Day of March, 2012

David J. Kappos
*Director of the United States Patent and Trademark Office*